United States Patent
Zuev et al.

(10) Patent No.: US 10,762,389 B2
(45) Date of Patent: Sep. 1, 2020

(54) METHODS AND SYSTEMS OF SEGMENTATION OF A DOCUMENT

(71) Applicant: ABBYY Production LLC, Moscow (RU)

(72) Inventors: Konstantin Zuev, Moscow (RU); Dmitry Deryagin, Moscow (RU); Mikhail Atroshchenko, Moscow (RU)

(73) Assignee: ABBYY Production LLC, Moscow (RU)

( * ) Notice: Subject to any disclaimer, the term of this patent is extended or adjusted under 35 U.S.C. 154(b) by 118 days.

(21) Appl. No.: 16/172,698

(22) Filed: Oct. 26, 2018

(65) Prior Publication Data
US 2020/0125898 A1 Apr. 23, 2020

(30) Foreign Application Priority Data
Oct. 23, 2018 (RU) ................ 2018137369

(51) Int. Cl.
| | |
|---|---|
| G06K 9/62 | (2006.01) |
| G06K 9/00 | (2006.01) |
| G06N 7/08 | (2006.01) |
| G06K 9/34 | (2006.01) |
| G06N 3/04 | (2006.01) |
| G06K 9/78 | (2006.01) |

(52) U.S. Cl.
CPC ....... *G06K 9/6261* (2013.01); *G06K 9/00442* (2013.01); *G06K 9/34* (2013.01); *G06N 3/04* (2013.01); *G06N 7/08* (2013.01); *G06K 9/78* (2013.01)

(58) Field of Classification Search
CPC ...... G06K 9/626; G06K 9/00442; G06K 9/34; G06K 9/78; G06N 7/08; G06N 3/04
See application file for complete search history.

(56) References Cited

U.S. PATENT DOCUMENTS

| | | | |
|---|---|---|---|
| 7,734,065 B2 | 6/2010 | Anisimovich et al. | |
| 8,509,534 B2 | 8/2013 | Galic et al. | |
| 2018/0108137 A1 | 4/2018 | Price et al. | |

OTHER PUBLICATIONS

Dafang He et al., "Multi-scale Multi-task FCN for Semantic Page Segmentation and Table Detection", 14th IAPR International Conference on Document Analysis and Recognition, 2017, 8 pages.
Hengshuang Zhao et al., "Pyramid Scene Parsing Network", arXiv:1612.011052v2 [cs.CV] Apr. 27, 2017, 11 pages.

(Continued)

*Primary Examiner* — Christopher Wait
(74) *Attorney, Agent, or Firm* — Lowenstein Sandler LLP

(57) ABSTRACT

Systems and methods are disclosed to receive an image depicting at least a part of a document and identify a plurality of partition points dividing the image into potential segments; generate a linear partition graph (LPG) comprising a plurality of vertices using the plurality of partition points and a plurality of arcs connecting the plurality of vertices; identify a path of the LPG having a value of a quality metric above a threshold value, wherein the path is selected from a plurality of paths of the LPG and comprises one or more arcs and the value of the quality metric is derived using a neural network classifying each of a plurality of pixels of the image; and generate one or more blocks of the image wherein each of the one or more blocks corresponds to an arc of the identified path and represents a portion of the image associated with a type of an object.

20 Claims, 14 Drawing Sheets

(56) References Cited

OTHER PUBLICATIONS

Tran, T.A., et al., "Page segmentation using minimum homogeneity algorithm and adaptive mathematical morphology", International Journal on Document Analysis and Recognition (IJDAR), Sep. 2016, vol. 19, Issue 3, pp. 191-209, 19 pages.

Azka Gilani et al., Table Detection using Deep Learning, National University of Sciences and Technology (NUST), Islamabad, Pakistan, 6 pages.

Liangcai Gao et al., "A Deep Learning-based Formula Detection Method for PDF Documents", 14th International Conference on Document Analysis and Recognition, 2017, 6 pages.

METHODS AND SYSTEMS OF SEGMENTATION OF A DOCUMENT

RELATED APPLICATIONS

This application claims priority to Russian Patent Application No. 2018137369 filed Oct. 23, 2018, the entire contents of which are hereby incorporated by reference herein.

TECHNICAL FIELD

The present disclosure is generally related to computer systems, and is more specifically related to systems and methods for segmentation of a document into blocks of various types.

BACKGROUND

An image may depict a document or a part of a document. The document may consist of various types of segments or blocks, such as title blocks, text blocks, chart blocks, table blocks, etc. An image processing engine may be tasked with identifying blocks of various types within an image.

SUMMARY OF THE DISCLOSURE

In accordance with one or more aspects of the present disclosure, an example method may comprise: receiving an image depicting at least a part of a document; identifying a plurality of partition points dividing the image into potential segments; generating a linear partition graph (LPG) comprising a plurality of vertices using the plurality of partition points and a plurality of arcs connecting the plurality of vertices; identifying a path of the LPG having a value of a quality metric above a threshold value, wherein the path is selected from a plurality of paths of the LPG and comprises one or more arcs of the plurality of arcs and the value of the quality metric is derived using a neural network classifying a plurality of pixels of the image; and generating one or more blocks of the image wherein each of the one or more blocks corresponds to an arc of the one or more arcs of the identified path and represents a portion of the image associated with a type of an object.

In accordance with one or more aspects of the present disclosure, an example system may comprise: a memory device storing instructions; a processing device coupled to the memory device, the processing device to execute the instructions to: receive an image depicting at least a part of a document; identify a plurality of partition points dividing the image into potential segments; generate a linear partition graph (LPG) comprising a plurality of vertices using the plurality of partition points and a plurality of arcs connecting the plurality of vertices; identify a path of the LPG having a value of a quality metric above a threshold value, wherein the path is selected from a plurality of paths of the LPG and comprises one or more arcs of the plurality of arcs and the value of the quality metric is derived using a neural network classifying a plurality of pixels of the image; and generate one or more blocks of the image wherein each of the one or more blocks corresponds to an arc of the one or more arcs of the identified path and represents a portion of the image associated with a type of an object.

In accordance with one or more aspects of the present disclosure, an example non-transitory computer-readable storage medium may comprise instructions that, when executed by a processing device, cause the processing device to: receive an image depicting at least a part of a document; identify a plurality of partition points dividing the image into potential segments; generate a linear partition graph (LPG) comprising a plurality of vertices using the plurality of partition points and a plurality of arcs connecting the plurality of vertices; identify a path of the LPG having a value of a quality metric above a threshold value, wherein the path is selected from a plurality of paths of the LPG and comprises one or more arcs of the plurality of arcs and the value of the quality metric is derived using a neural network classifying a plurality of pixels of the image; and generate one or more blocks of the image wherein each of the one or more blocks corresponds to an arc of the one or more arcs of the identified path and represents a portion of the image associated with a type of an object.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
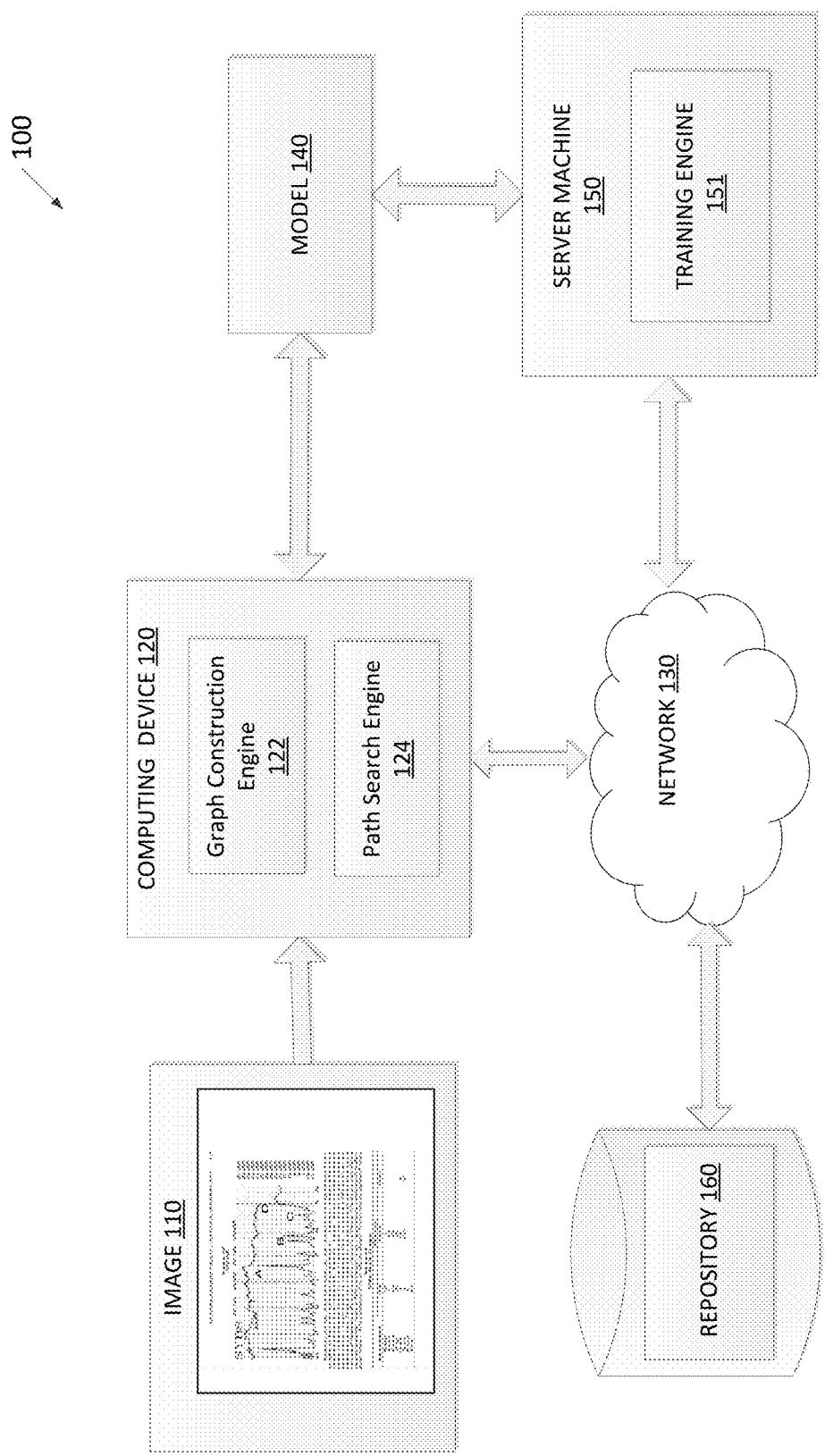
FIG. 1 depicts a high-level component diagram of an illustrative system architecture, in accordance with one or more aspects of the present disclosure.

As discussed previously, a document page may consist of various types of segments or blocks. Each block may be associated with a distinct type of an elemental object, including but not limited to, a title, text, chart, table, graphics, etc. Various methods may be used to analyze an image depicting the document page for segmentation of the document page into blocks of various types.

Conventionally, image segmentation problems may utilize low level and/or high level mechanisms to provide solutions. A low level mechanism is that which generally operates directly with the images. In a low level mechanism, for example, an image may be preprocessed (e.g., by removing texture), atomic objects (e.g., connected components, separators, etc.) within the image may be extracted, and the atomic objects may be classified. A mechanism that is at a higher level than the low level mechanisms above may not work directly with images, rather, may operate on the atomic objects extracted by low level mechanisms.

At the highest levels, the mechanisms may utilize a "model" approach. In a model approach, particular features of an image or objects within the image may be interpreted on the basis of their core characteristics and/or connections to the nearest objects, as well as based on the role of the features or objects in the document depicted within the image. For example, it may be determined how each of the extracted atomic object fits into the logical structure of the document. Such interpretation may be performed by superimposing models onto "contexts." A context, for example, may be defined as a given region of the image. A model may express how particular features of an image are likely to look given that the type of document within the image is specified. In an example, a "single column model" may assume that the document consist of a "single column structure" where the objects within the image have an orientation in the same direction (e.g., objects are horizontally or vertically oriented). The single column model may assume that the context of an image can be separated into elemental objects (e.g., tables, text, etc.) that do not intersect along a vertical direction, for example. The quality of the model may depend on how well the model is defined and identifies the characteristics of each object within images. In another example, a "multi column model" may operate under the assumption that the context of the image is a document that contains multiple columns. Each column may individually have a single column structure; however, the multiple columns may have structures where objects are oriented in different directions. In such types of models, a superimposition of models may be performed in two steps. First, the basic structure of the document is determined to identify each of the column of the multiple columns, and second, each of the columns are further analyzed individually (e.g., lines of text or tables are searched for within each individual columns). Thus, multi column structures can be analyzed by breaking up the image into a plurality of single column structures and applying the single column model analysis on each single column structure.

In some examples, a bottom up algorithm may be used to analyze single column regions of images. A bottom up algorithm may consist of utilizing independent mechanisms to analyze elemental objects of different types, such that each mechanism may be used to search for an elemental object of a specified type. For example, to search for a paragraph using a bottom up principle, potential extracted symbols from an image maybe joined into potential words, the potential words may then be combined into potential lines, and the potentials lines may be combined into potential paragraphs to provide the ultimate search result for the paragraph search. In other examples in their simplified description, a search for tables may be performed by joining lines; a search for charts may be performed by joining connected components, etc. The result may be composed of objects that do not intersect along the same direction (e.g., along the vertical direction, along the horizontal direction, etc.). However, a shortcoming of the bottom up approach is that it uses a greedy algorithm. A greedy algorithm makes a locally optimal choice at each stage with an intent of finding a globally optimum solution. In many problems, a greedy algorithm may find a global solution in a reasonable amount of time; however, it may not produce the best global solution. In the instant situation, the bottom up approach using individual mechanisms can be greedy because each individual mechanism may search and produce results for a particular type of an object but is not aware of results of the other mechanisms for other types of object within the same image region. For example, a text search mechanism for a region of an image does not take into consideration results of a table search mechanism for the same region of the image. As such, the bottom up approach may not be capable of producing the best segmentation decision.

The systems and methods described herein represent significant improvements in producing more accurate segmentation of a single column region of document into blocks of various types of elemental objects by representing different variants of potential segmentation options of the single column region of document as paths of a linear partition graph (LPG). The LPG can be searched to determine the most optimal path among the variants of potential segmentation options using the results of classifying each pixel of an image by neural networks and compare results of each path such that the ultimate decision is not based on isolated analysis; rather the decision may be informed by results of analysis each of the paths of the variants of potential segmentation options. The mechanism may include receiving an image depicting at least a part of a document for which various blocks may be identified. A plurality of partition points may be identified using characteristics of the image. For example, histograms of black and/or colored pixels may be used to identify partition points. The plurality of partition points may be used to divide the image into variants of potential segments. A linear partition graph (LPG) may be constructed using the plurality of partition points. The LPG may comprise of vertices and arcs, where partition points are selected as vertices of the LPG and the arcs are formed by connecting the vertices. In some examples, the vertices may be selected by filtering the partition points based on various factors, and the arcs may similarly be selectively placed between chosen vertices based on various factors. After construction of the LPG, the various paths of the LPG may be searched to identify a complete path of the LPG that produces an optimal quality of segmentation. The complete path is a particular case of multiple possible partial paths. Partial paths are paths that begin at the topmost vertex but may not always end at the bottom most vertex. A partial path may be considered a complete path if it ends at the bottom most vertex. The determination of the complete path may be based on a quality metric calculated by the mechanism. The quality metric of partial and complete paths may be calculated in multiple stages. The stages may include identifying an a priori estimate of each arc to belong to a particular object type, and an a posteriori quality of the most perspective arcs (a more detailed description please see below) based on further calculations based on results of analysis of the arcs. A neural network classifying a plurality of pixels of the image may be used in calculating the values of the quality metric. Based on the identified complete path of the LPG, one or more blocks of the image may be generated to produce the segmentation result of the document. Each of the one or more blocks may correspond to an arc of comprised in the identified path and represents a portion of the image associated with a type of an object.

The search allows for determining the optimal separation of columns into blocks and selecting the optimal result of the block analysis. The methods herein provide a higher quality result of the analysis of a single column region compared with the results of greedy algorithms, such as the bottom up approach. Use of the neural network to predict probabilities that each pixel of the image belongs in a certain class of objects also increases the overall speed of the segmentation algorithm.

Various aspects of the above referenced methods and systems are described in details herein below by way of examples, rather than by way of limitation.

FIG. 1 depicts a high-level component diagram of an illustrative system architecture 100, in accordance with one or more aspects of the present disclosure. System architecture 100 includes a computing device 120, a repository 160, and a server machine 150 connected to a network 130. Network 130 may be a public network (e.g., the Internet), a private network (e.g., a local area network (LAN) or wide area network (WAN)), or a combination thereof.

The computing device 120 may perform segmentation of a document image. In one embodiment, computing device 120 may be a desktop computer, a laptop computer, a smartphone, a tablet computer, a server, a scanner, or any suitable computing device capable of performing the techniques described herein. Computing device 120 may receive one or more images. In an example, image 110 may be received by the computing device 120. Image 110 may include an image of a document, a document page, or a part of a document page. In an example, various blocks within the document may need to be identified. The document page or the part of the document page depicted in image 110 may have a single column structure. Image 110 may be provided as an input to computing device 120. Computing device 120 may identify an optimal segmentation option and generate as output one or more blocks of the image representing portions of the image 110 associated with different types of objects.

In one embodiment, computing device 120 may include a graph construction engine 122 and a path search engine 124. The graph construction engine 122 and the path search engine 124 may each include instructions stored on one or more tangible, machine-readable storage media of the computing device 120 and executable by one or more processing devices of the computing device 120. In one embodiment, graph construction engine 122 may generate a linear partition graph (LPG) based on image 110. For example, the LPG may comprise a plurality of vertices and arcs, where the vertices may be derived using partition points identified within image 110 and arcs may be derived by connecting the vertices.

In one embodiment, path search engine 124 may use a trained machine learning model 140 that is trained and used to classify pixels of image 110 into different classes of elemental objects. The machine learning model 140 may be trained using training set of images and corresponding classes of objects for each pixel. In some instances, the machine learning model 140 may be part of the path search engine 124 or may be accessed on another machine (e.g., server machine 150) by the path search engine 124. Based on the output (e.g., probability maps for pixels of the image) of the trained machine learning model 140, path search engine 124 may search for paths within the LPG generated by graph construction engine 122 to identify a path that is associated with a value of a quality metric meeting a threshold value to produce an optimal path within the LPG. The path search engine 124 may also generate one or more blocks corresponding to one or more arcs within the identified path where each block may represent a type of an object.

Server machine 150 may be a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The machine learning model 140 may refer to model artifacts that are created by the training engine 151 using the training data that includes training inputs and corresponding target outputs (correct answers for respective training inputs). During training, patterns in the training data that map the training input to the target output (the answer to be predicted) can be found, and are subsequently used by the machine learning model 140 for future predictions. As described in more detail below, the machine learning model 140 may be composed of, e.g., a single level of linear or non-linear operations (e.g., a support vector machine [SVM]) or may be a deep network, i.e., a machine learning model that is composed of multiple levels of non-linear operations). Examples of deep networks are neural networks including convolutional neural networks, recurrent neural networks with one or more hidden layers, and fully connected neural networks.

As noted above, the machine learning model 140 may be trained to determine the probability of pixels of images belonging to a predetermined class of object using training data, as further described below. Once the machine learning model 140 is trained, the machine learning model 140 can be provided to path search engine 124 for analysis of image 110. For example, the path search engine 124, for each arc comprising a portion of image 110, may request the results of analysis of the portion of image by the machine learning model 140. In some examples, model 140 may consist of a convolutional neural network. The path search engine 124 may obtain one or more outputs from the trained machine learning model 140. The output may be a set of probability maps for the arc to belong in different classes of objects.

The repository 160 may be a persistent storage that is capable of storing image 110 as well as data structures to tag, organize, and index the image 110. Repository 160 may be hosted by one or more storage devices, such as main memory, magnetic or optical storage based disks, tapes or hard drives, NAS, SAN, and so forth. Although depicted as separate from the computing device 120, in an implementation, the repository 160 may be part of the computing device 120. In some implementations, repository 160 may be a network-attached file server, while in other embodiments, repository 160 may be some other type of persistent storage such as an object-oriented database, a relational database, and so forth, that may be hosted by a server machine or one or more different machines coupled to the via the network 130.

Figure 2:
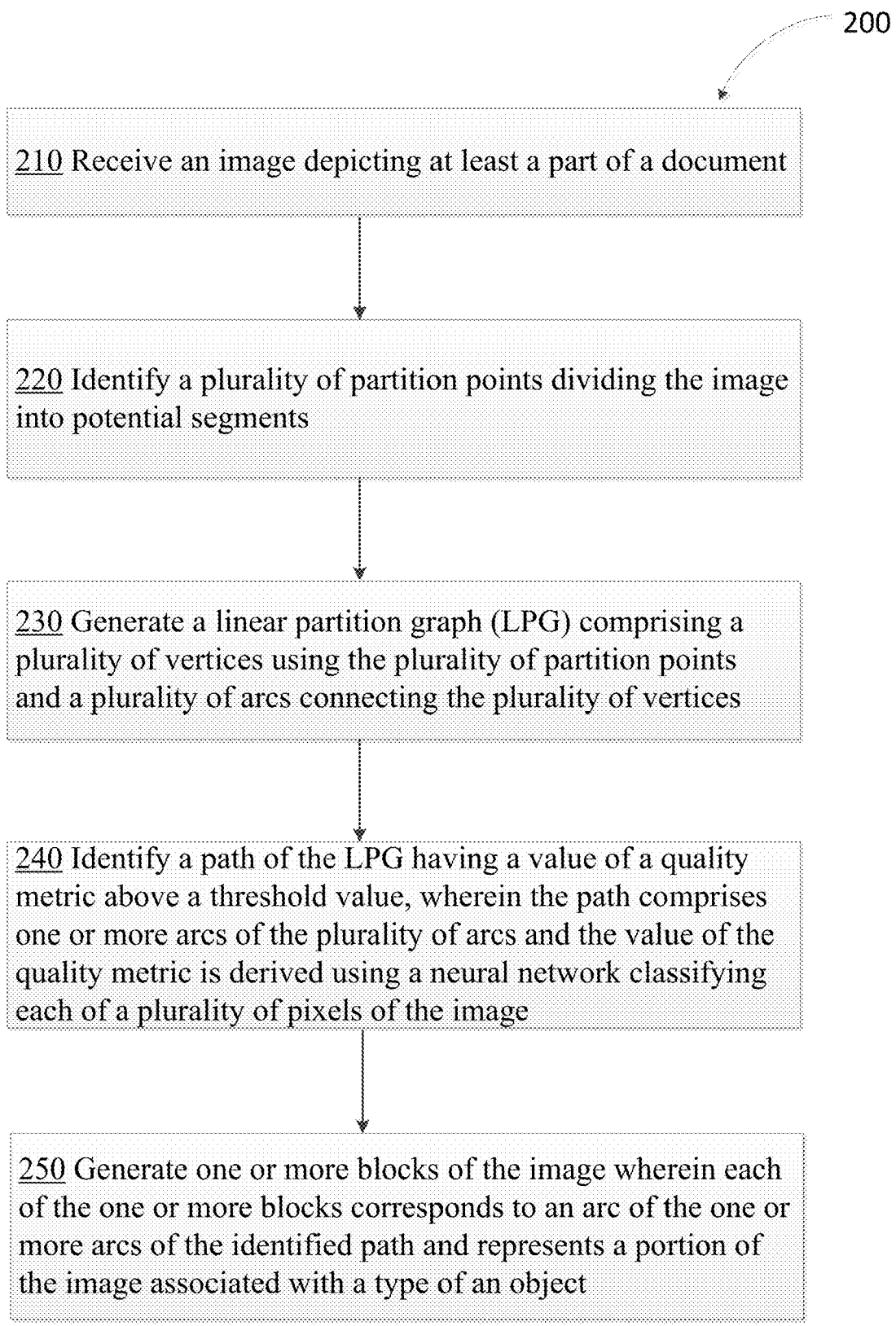
FIG. 2 depicts a flow diagram of one illustrative example of a method for segmentation of a document into blocks of various types, in accordance with one or more aspects of the present disclosure.

FIG. 2 depicts a flow diagram of one illustrative example of a method for segmentation of a document into blocks of various types, in accordance with one or more aspects of the present disclosure. Method 200 and/or each of its individual functions, routines, subroutines, or operations may be performed by one or more processors of the computer system (e.g., example computer system 1000 of FIG. 10) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated description lists the operations of method 200 in certain order, various implementations of the method may perform at least some of the described operations in parallel and/or in arbitrary selected orders. In one implementation, the method 200 may be performed by one or more of the various components of FIG. 1, such as, graph construction engine 122, path search engine 124, etc.

Figure 3:
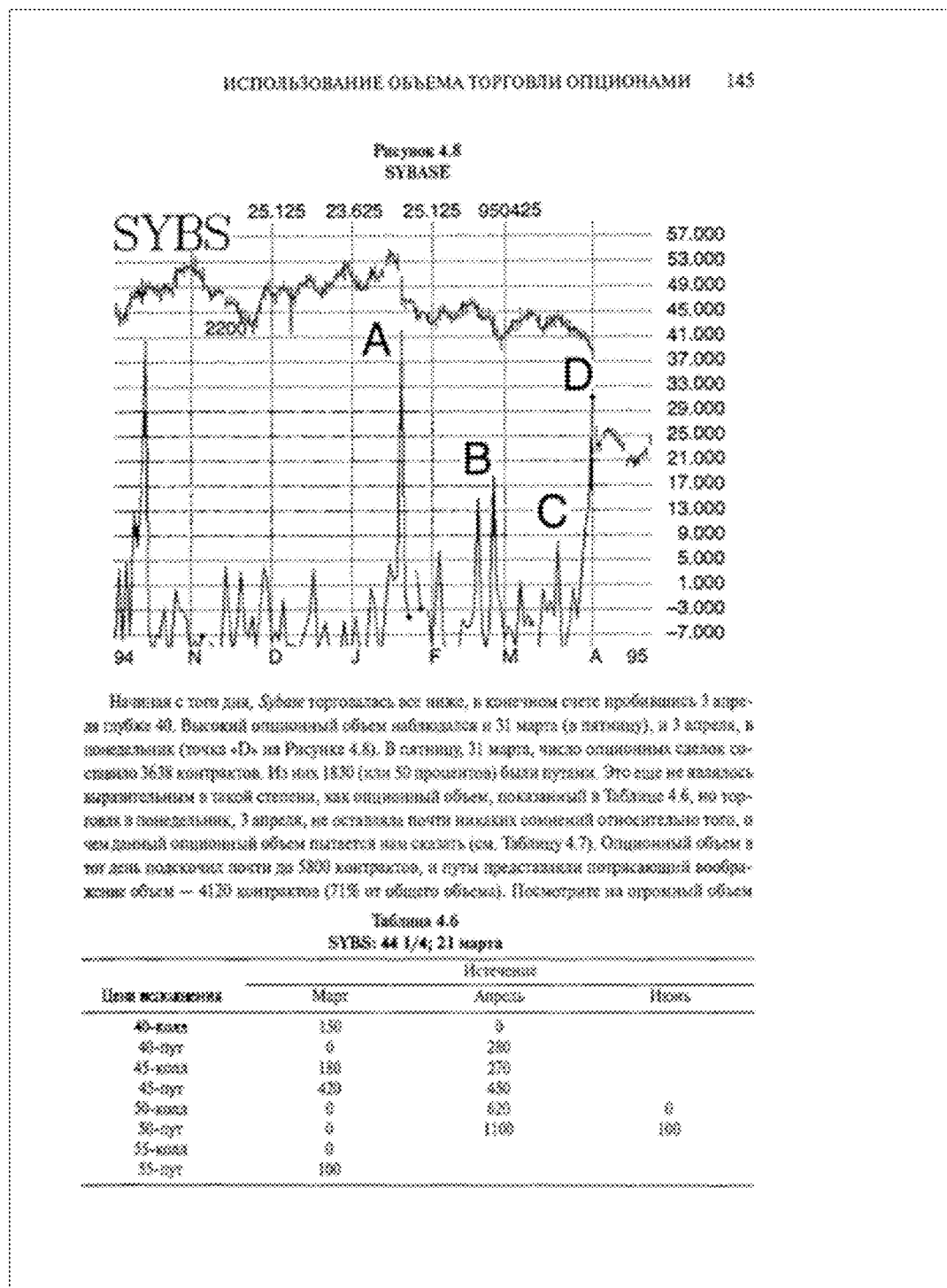
FIG. 3 depicts one illustrative example of an image depicting a document page for segmentation of the document into blocks of various types, in accordance with one or more aspects of the present disclosure.

At block 210, the computer system implementing the method may receive an image. The image may depict at least a part of a document. The part of the document may comprise a single column structure. A single column structure may include objects within the part of the document having an orientation in a same direction. A document may include a printed document, a digital document, etc. FIG. 3 shows an example of an image depicting a document 300 for segmentation into various blocks. All elemental objects (e.g., text lines, paragraphs, tables, charts, etc.) within document 300 are depicted as having orientation in the horizontal direction and the objects do not intersect along the vertical direction. Document 300 may be a document page with a single column structure or a region of a multi column document page that has a single column structure. In an example, if a document of interest is a two column page, the document may be processed such that two single column regions are identified. Each of the two single column regions may be received by the computer system implementing the method for segmentation purposes.

Figure 4A:
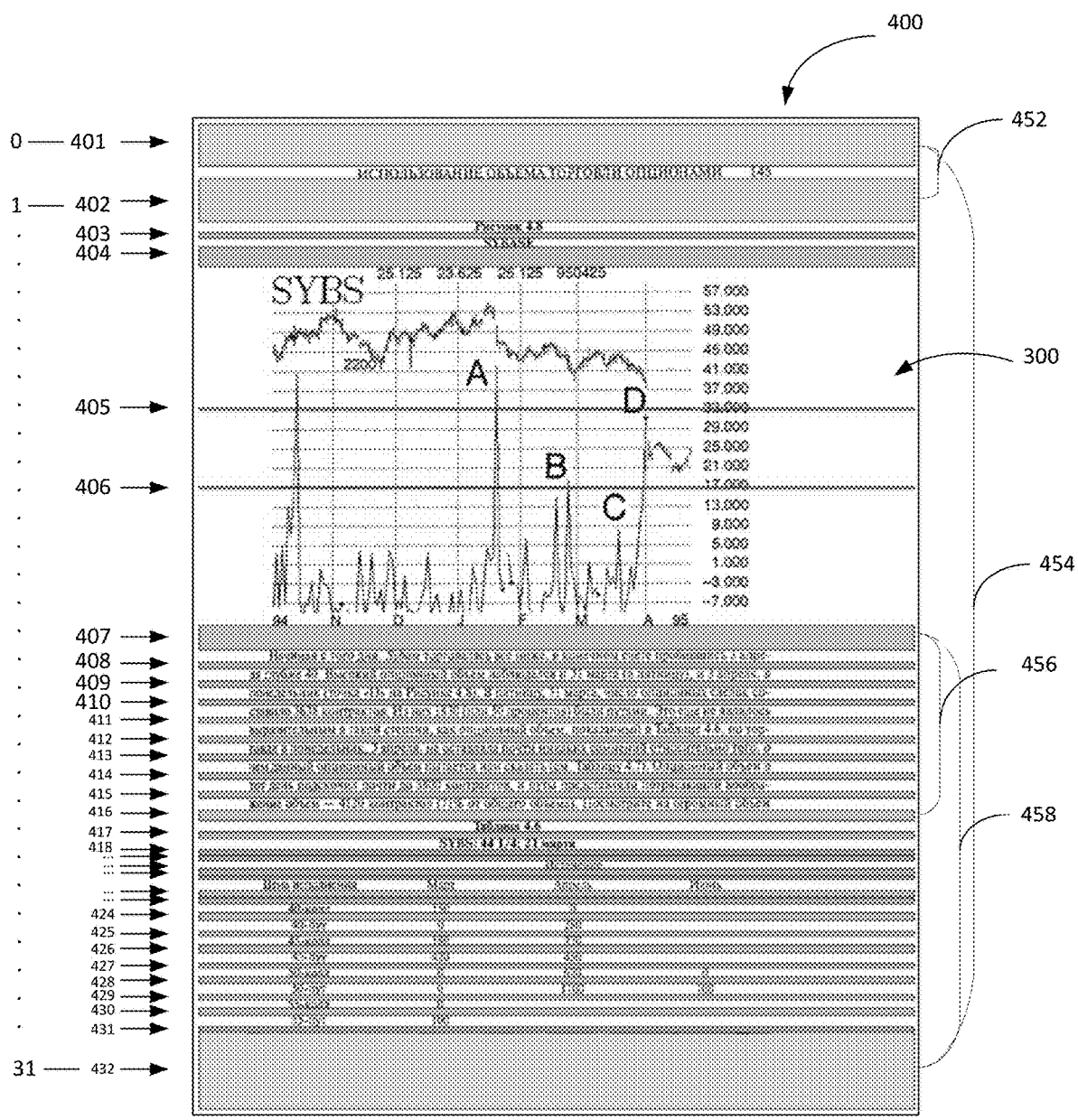
FIG. 4A depicts an illustrative example of identifying partition points for dividing an image depicting a document page, in accordance with one or more aspects of the present disclosure.
Figure 4B:
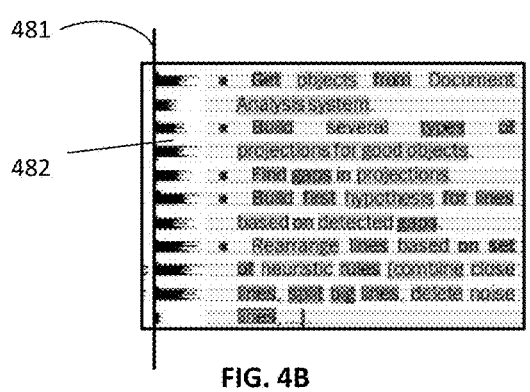
FIG. 4B depicts an illustrative example identifying partition points using histograms, in accordance with one or more aspects of the present disclosure.

Referring back to FIG. 2, at block 220, the computer system may identify a plurality of partition points dividing the image into potential segments. For example, FIG. 4A depicts an example of identifying partition points for dividing the image 400 depicting document 300 of FIG. 3. The plurality of partition points may be identified using characteristics, features, or atomic objects extracted from the image 400. For example, histograms of black or colored pixels may be used to identify partition points. FIG. 4B depicts an example identifying partition points using histograms. A histogram of black pixels may be projected on the vertical axis 481. The histogram may contain empty spaces, e.g., spaces with zero count of black pixels. Empty spaces (e.g., empty space 482) on the histogram may indicate blank spaces on the image corresponding to the point on the vertical axis. The empty spaces may be considered as the partition points. Referring back to FIG. 4A, partition points may be identified where there are blank spaces between elemental objects (e.g., text, pictures, etc.) within image 400. Each blank space between the objects of image 400 may be defined as a partition point. In FIG. 4A, each horizontal blank space regions within image 400 are marked by boxes 401-432, which are determined as the partition points. The partition points are further marked with numbers ranging from "0" to "31" where the number "0" corresponds to the box 401 and represents the starting point of the partition points and "31" corresponds to box 432 and represents the ending point of the partition points. These numbers are used to refer to the vertices of the LPG. In some implementation, the partition points may be received as a type of atomic object extracted from an image by low level mechanism and may be sent with the image 400 for further processing.

Referring back to FIG. 2, at block 230, the computer system may generate a linear partition graph (LPG). The LPG may comprise a plurality of vertices and a plurality of arcs (edges). The plurality of vertices may be derived using the plurality of partition points. The plurality of arcs may be derived by connecting the plurality of vertices. In an example, the LPG may be a directed acyclic graph (DAG), where there is a source at the very top partition point and a sink at the very bottom partition point and every arc is directed from an earlier point to a later point in the graph. Each of the identified partition points can become a vertex (a node) of the LPG. Some or all vertices can be followed from top to bottom and connected to form an arc.

In some implementations, the LPG may be generated by selecting all partition points as the plurality of vertices of the LPG. In some implementations, the LPG may be generated by filtering partition points to select a subset of the plurality of partition points as the plurality of vertices of the LPG. The identified partition points may be classified to get a quality of each partition point. For instance a classifier may use the following features: average dimension of a space corresponding to a partition point (e.g., a width of space divided by an average height of line of text within the document, or a width of space in cm/inches, etc.); maximum quality of separators that pierce a space (that is, solidity of the space); weighted quantity of separators that pierce a space, etc. Additional factors may also be taken into consideration for selection of the vertices. In some implementations, a threshold of the number of maximum vertices may be set. For example, a maximum limit may be set to 15 vertices to be selected out of the available partition points.

Similarly, in some examples, the LPG may be generated by selecting pairs of vertices out of the available vertices of the LPG and connecting each of the selected pairs of vertices to form each of the plurality of arcs of the LPG. That is, not every downstream vertex (e.g., partition point) may receive an arc. Arcs may be placed between vertices if the arc has a high probability of representing a portion of the image corresponding to an accurate segmentation of block. The selection of pairs of vertices for forming the arcs may be based on various factors. In some examples, the pairs of vertices (e.g., partition points) may be classified based on one or more factors, such as, maximum quality indicator of partition points encompassed within the pairs of the vertices; relative dimension (e.g., width, height) of portions of the image (e.g., blank spaces) corresponding to partition points; weighted quantity of partition points encompassed within the pairs of the vertices; etc. Based on the result of the classification of partition points, pairs of vertices are selected to connect for forming the arcs of the LPG. For a current partition point being considered for an arc, a partition point located below the current partition point may be assessed for selection for connecting to form an arc. In an example, the selection may be based on the quality of partition points located below the current partition point and the amount of selected partition points $M<=\min(5, k)$, where k is the amount of partition points located below the current partition point. In various implementations, the arcs may be filtered this way to limit the size of the LPG. A threshold of the number of maximum arcs may be set. For example, a maximum limit may be set to 5 arcs to be formed from any given vertex.

Figure 4C:
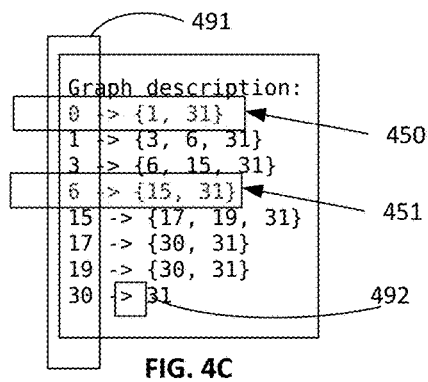
FIG. 4C depicts an illustrative example of construction of a linear partition graph for an image depicting a document page, in accordance with one or more aspects of the present disclosure.

FIGS. 4A and 4C show the construction of an LPG by selecting vertices and arcs connecting the vertices. Using the factors described above, partition points 0-31 may be selected as the vertices of the LPG. In FIG. 4C, box 491 and 492 includes the plurality of vertices of the LPG which have been connected in pairs by arcs. In the example for FIG. 4C, the vertices forming the arc include a subset of 9 partition points: 0, 1, 3, 6, 15, 17, 19, 30, and 31.

Next, the vertices of the LPG are connected to form the arcs of the LPG. As discussed above, not all 9 vertices are connected to each other to form arcs; rather, pairs of vertices are selected to form the arcs of the LPG. The pairs of vertices are selected to include the most likely arcs to represent the correct segmentation of images into blocks based on factors described above. For example, FIG. 4A shows arcs originated from partition point 401 (vertex 0) and 407 (vertex 6). As shown, from vertex 0 (partition point 401), two arcs are formed. The first arc 452 is formed by connecting a pair of vertices, vertex 0 (partition point 401) and vertex 1 (partition point 402). The second arc 454 is formed by connecting another pair of vertices, vertex 0 (partition point 401) and vertex 31 (partition point 432). In FIG. 4C, the graph description illustrates these two arcs 452 and 454 as the vertex 0 having two arcs, represented by the first row 450 of the graph description "0→{1, 31}." That is, there is an arc extending from vertex 0 to vertex 1, and another arc extending from vertex 0 to vertex 31. In another example, FIG. 4A shows two arcs are formed from partition point 407 (vertex 6). The arc 456 is formed by connecting a pair of vertices, vertex 6 (partition point 407) and vertex 15 (partition point 416). The arc 458 is formed by connecting another pair of vertices, vertex 6 (partition point 407) and vertex 31 (partition point 432). In FIG. 4C, the graph description illustrates these two arcs 456 and 458 as the vertex 6 having two arcs, represented by row 451 of the graph description "6→{15, 31}." That is, there is an arc extending from vertex 6 to vertex 15, and another arc extending from vertex 6 to vertex 31.

Referring back to FIG. 2, at block 240, the computer system may identify a path of the LPG having a value of a quality metric above a threshold value. The path may comprise one or more arcs of the plurality of arcs. The value of the quality metric may be derived using a neural network classifying each of a plurality of pixels of the image. The threshold value may be derived based on a number of top values of the quality metric associated with one or more paths of the LPG, wherein a range of the values for the top values are within a specified range. The identified path may be selected from a plurality of paths having values of the quality metric above the threshold value. The selection of the path may be based on a pairwise comparison of each of the plurality of paths. The values of the quality metric for the plurality of arcs may be derived based on an initial (a priori) estimate of probabilities of each arc of the plurality of arcs corresponding to each of a number of predetermined object types. The probabilities may be estimated based on a subset of the plurality of pixels of the image corresponding to each arc of the plurality of arcs based on the neural network classifying each of the plurality of pixels of the image. The image may be provided to the neural network as an input. A set of probabilities may be obtained as output from the neural network for each of the plurality of pixels of the image belonging to each of a plurality of predetermined classes of objects corresponding to each of the number of predetermined object types. Values of the quality metric of a partial path and a complete path may be further derived based on a maximum value of the a priori estimate of probabilities for each arc of the plurality of arcs corresponding to each of a number of predetermined object types (a more detailed description please see below).

The construction of the LPG may allow identifying an optimal complete path (e.g., a path with the maximum total value of the quality metric of acrs encompassed within the path) connecting the topmost and the lowermost partition points of the image. In addition to identifying the optimal complete path segmenting the image into different blocks, each arc of the complete path is analyzed to determine what type of block the arc corresponds to. That is, the analysis may produce a result indicating that one of the arcs of the complete path corresponds to a table block, another arc of the complete path corresponds to a text block, etc. The search for an optimal complete path may be performed in several stages. In some implementations, the search to identify the optimal path of the LPG may include calculating an a priori estimate and an a posteriori estimate of quality of the arcs within the LPG. The search for the optimal path may involve using an "A*" search algorithm on the LPG. A* is an informed search algorithm for graph traversal and path-finding. It is formulated in terms of weighted graphs: starting from a specific starting node of a graph, it aims to find a path to the given goal node having the smallest cost (least distance travelled, shortest time, etc.) or highest quality metric in a method described herein. It does this by maintaining a tree of paths originating at the start node and extending those paths one edge at a time until its termination criterion is satisfied.

The computer system may calculate an "a priori" estimate (e.g., an initial estimate) for each arc of the plurality of arcs of the LPG. The a priori estimate may provide an estimate of probabilities of each arc of the plurality of arcs corresponding to each of a number of predetermined object types prior to performing the A* search on the LPG. Calculating the a priori estimate may involve using various analyzers on the arcs of the LPG. For example, the analyzers may include analyzers for predetermined object types, such as, a text analyzer, a chart analyzer, a picture analyzer, a table analyzer, etc. Each of the analyzers provide an estimate of probability that an arc analyzed by the particular analyzer belongs to the object type represented by the analyzer. For example, a table analyzer may provide an estimate for a particular arc that the probability of that arc corresponding to an object type of "table" is 0.8. If there are N numbers of predetermined object types identified with N numbers of analyzers running on each arc, then for each arc the number of a priori estimate of probabilities may equal to N. For example, if N is 4, that is, if there are 4 predetermined object types (e.g., a text analyzer, a chart analyzer, a picture analyzer, and a table analyzer), then 4 a priori estimates may be obtained for each arc of the LPG.

Figure 5A:
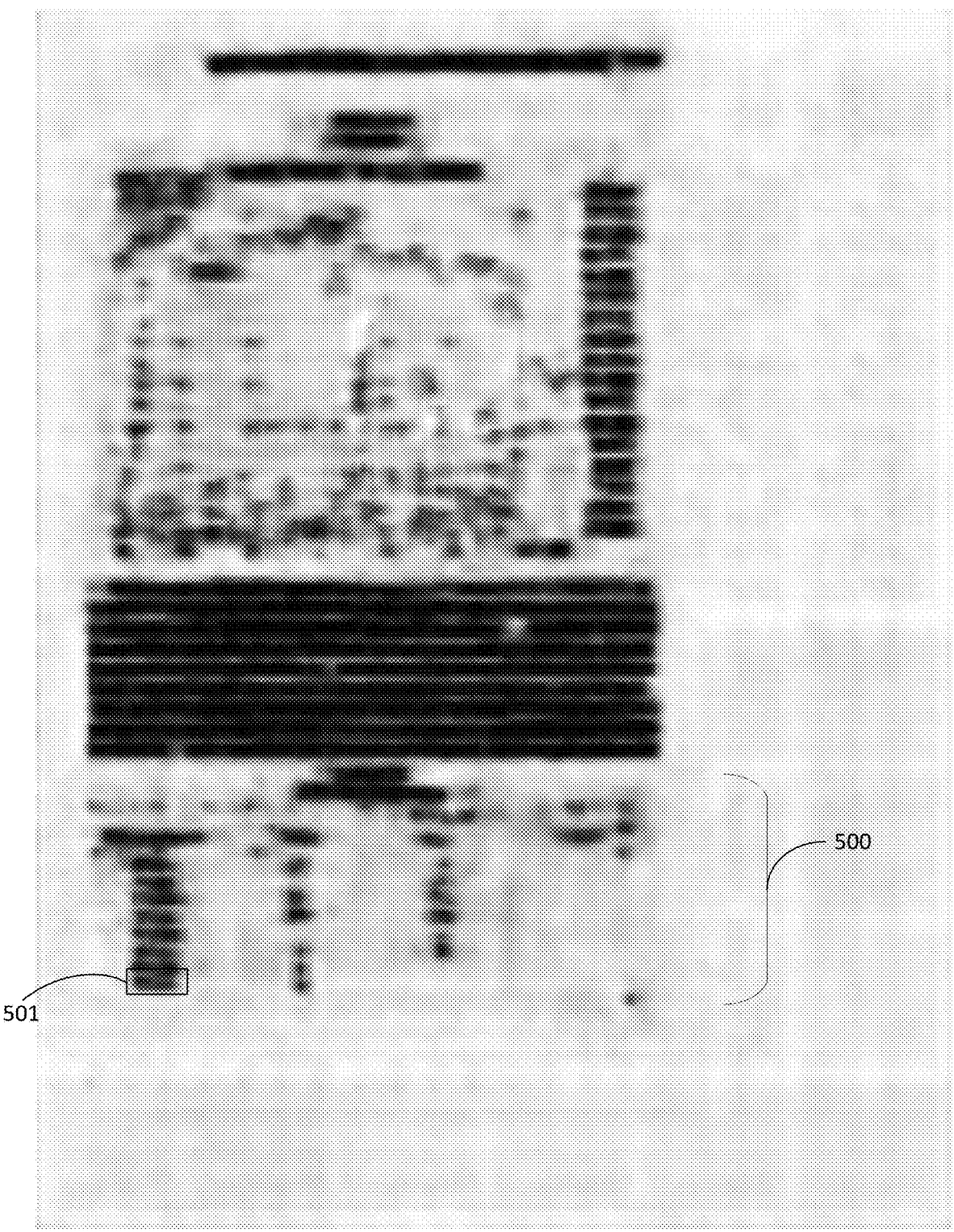
FIGS. 5A-5C depict examples of probability maps generated by a neural network of an image depicting a document, in accordance with one or more aspects of the present disclosure.
Figure 5B:
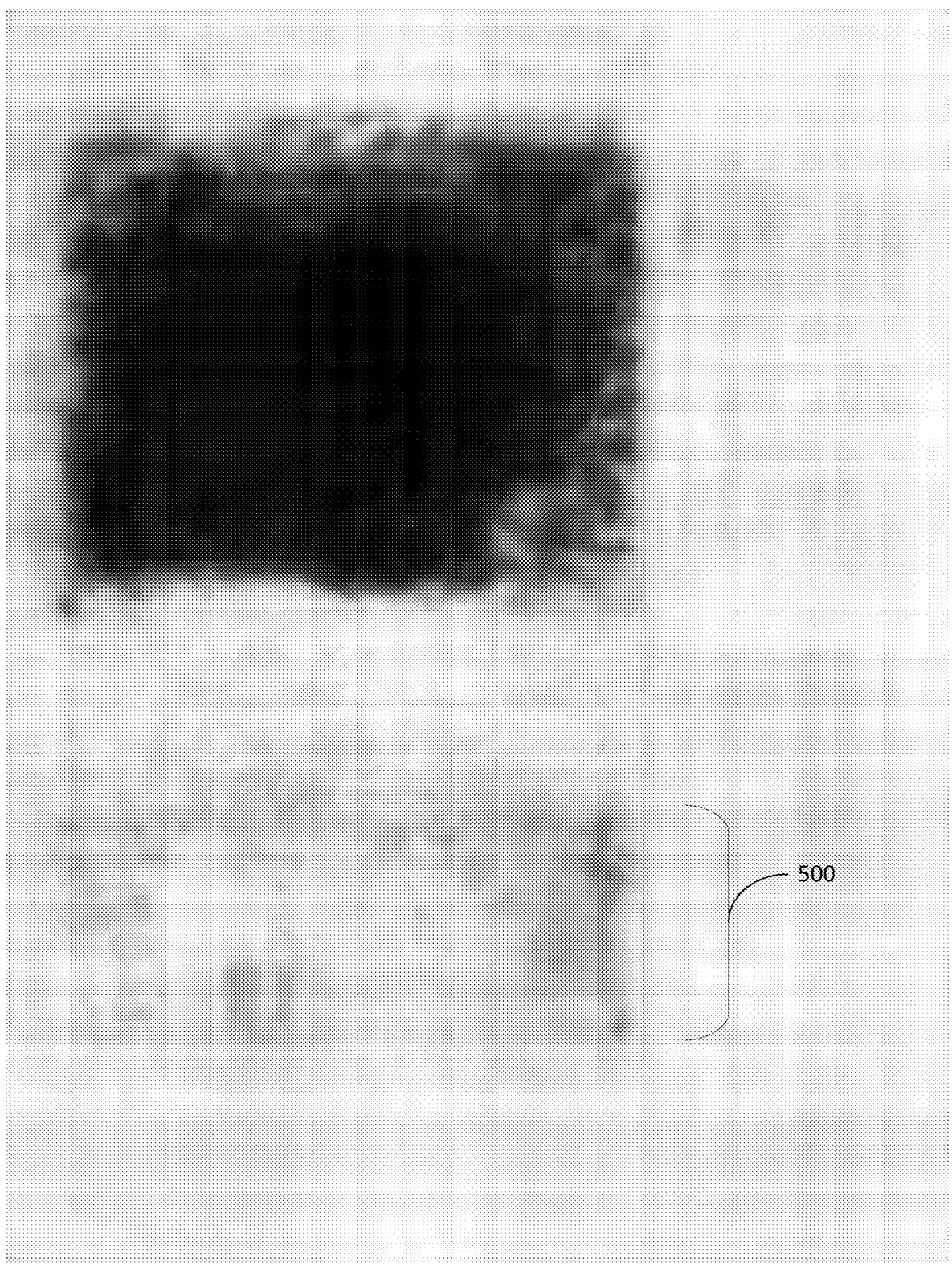
Figure 5C:
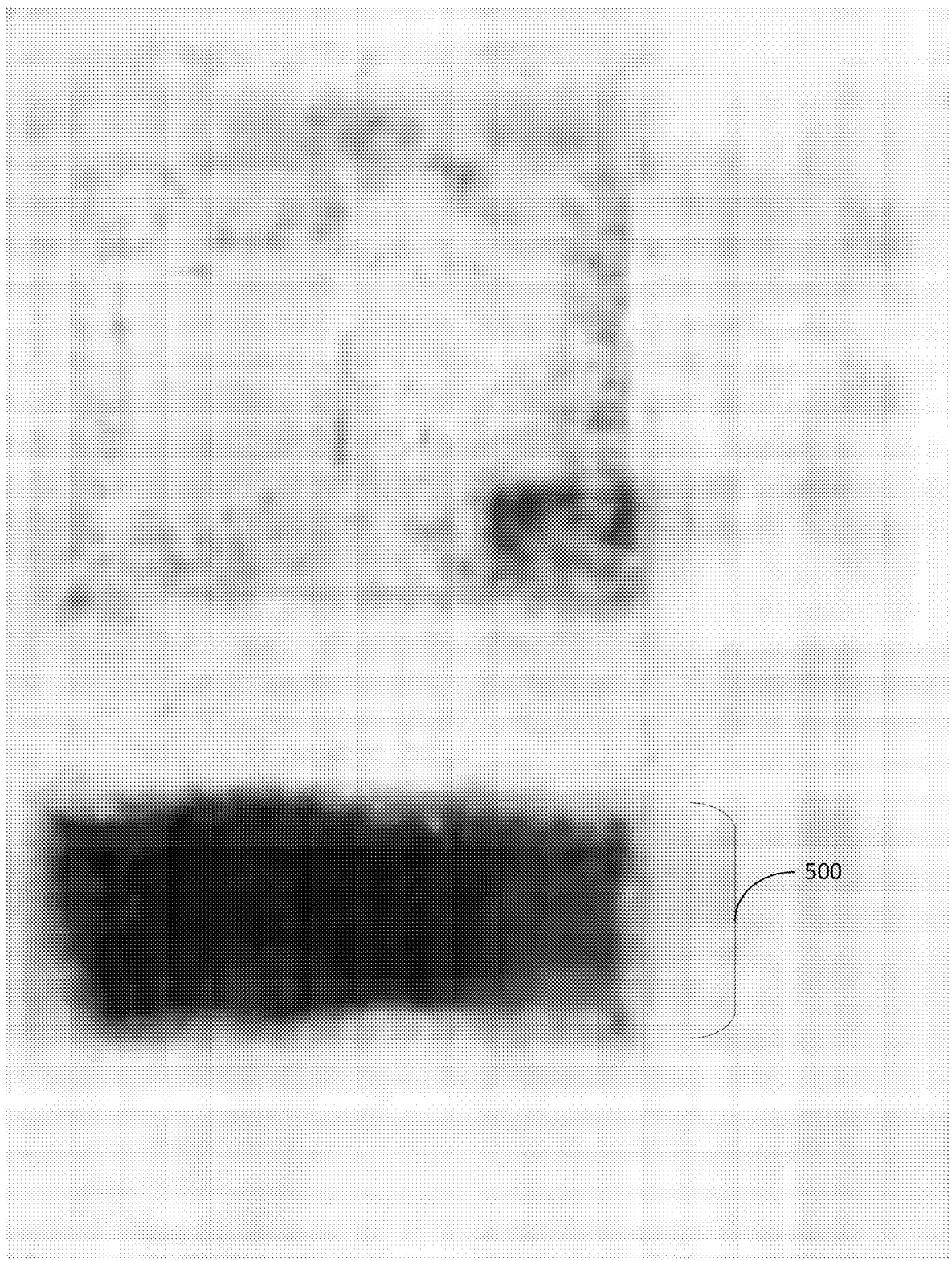

The a priori estimate of the probabilities may be calculated based on analysis of the image of a document page by a neural network (e.g., a convolutional neural network). The a priori estimate is a quick and not resource-consuming estimate of probabilities of each arc of the plurality of arcs corresponding to each of a number of predetermined object types. The a priori estimate is calculated for each arc in a LPG. The received image may be provided to the neural network as an input. The neural network may provide a set of probabilities as output. The set of probabilities may indicate for each pixel of the plurality of pixels of the image probabilities that the pixel belongs to each of the predetermined classes of objects defined within the neural network. The predetermined classes of objects may correspond to the predetermined object types of the analyzers. The number of predetermined classes of objects may also be N, or equal to the number of predetermined object types for the analyzers. For example, the predetermined classes of objects for the neural network may include classes for text, pictures, charts, tables, etc. The neural network may be trained using training images and classification of each pixel of the training images into the predetermined classes of objects. Thus, when the received image is input into the neural network, an output may be provided to identify the probability value that a particular pixel of the received image belongs to a particular class of objects. For example, the neural network may provide for each pixel the probability of the pixel being in a table class, a text class, a picture class, etc. FIGS. 5A-5C depict probability maps of the set of probabilities generated by a neural network for each pixel of image 400. FIG. 5A shows an example of a probability map of the class text for a region 500 containing a subset of pixels. Each pixel in the region 500 is analyzed by the neural network. The neural network identifies probabilities of the pixels of region 500 belonging to the "text" class. The dark areas in the image, such as area 501, indicate high probability of the pixel belonging in the text class. Similarly, FIG. 5B shows a probability map of the "picture" for region 500 using the dark areas therein and FIG. 5C shows a probability map of the "table" class for region 500 using the dark areas therein. Further description of the neural network topology is described with reference to FIG. 9 below.

The a priori estimate or the initial estimate of the probabilities may be calculated using a subset of the plurality of pixels of the image corresponding to each arc of the plurality of arcs being analyzed for the a priori estimate based on the neural network classifying each of the plurality of pixels of the image. In an example, each analyzer may consider the neural network output for the subset of pixels in the region encompassed by the particular arc that the analyzer currently analyzes. For example, the region may be a portion, such as a rectangle, of a certain size that corresponds to the particular arc. Using the pixels within the region corresponding the arc, the analyzer may provide an a priori estimate that the region belongs to the type of object represented by the analyzer. In an example, if a threshold percentage of pixels within the region are classified by the neural network as having high probability of belonging to a particular class, then the analyzer corresponding to that particular class of object may provide a high a priori estimate that the arc corresponds to that particular object type. In another example, if a majority of the of pixels within the region are classified by the neural network as having low probability of belonging to a particular class, then the analyzer corresponding to that particular class of object may provide a low a priori estimate that the arc corresponds to that particular object type. For example, a text analyzer may analyze an arc encompassing a region with a high table probability. That is, majority of pixels within the region has been classified by the neural network output as belonging to the table class with high probability. The a priori estimate of probability that the arc corresponding the region is a text will be low.

Figure 6:
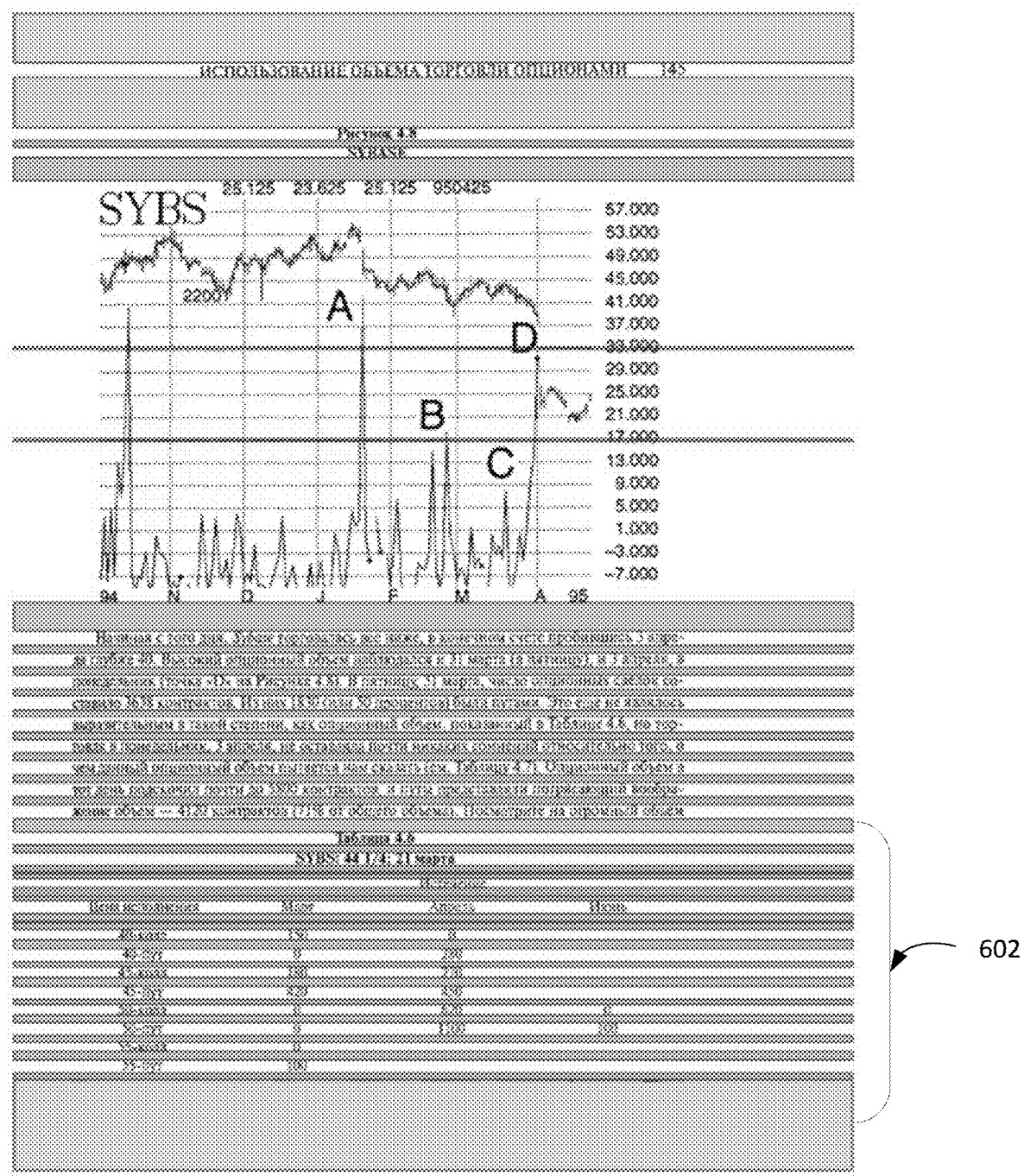
FIG. 6 depicts an illustrative example of calculation of an a priori estimate of an arc of a linear partition graph, in accordance with one or more aspects of the present disclosure.

FIG. 6 depicts an illustrative example of calculation of an a priori estimate of an arc of an LPG. The a priori estimate, for the arc 602 is calculated using the output of the neural network for the corresponding region of the image 400. The output of the neural network for each class (e.g., text, picture, table), as identified in FIGS. 5A-5C, are used by each analyzer corresponding to that class. When arc 602 is analyzed by the text analyzer, it provides a low a priori estimate of probability that the arc corresponds to the "text" object type. The estimate is based on the output of the neural network for corresponding region 500 in FIG. 5A, which provided a probability map for pixels within region 500 that belong to the text class. The estimate is low as majority of the pixels are not marked as having a high probability of being assigned to the text class, as indicated by the dark areas. Similarly, when arc 602 is analyzed by the picture analyzer, it provides a low a priori estimate of probability that the arc corresponds to the "picture" object type based on the output of the neural network for corresponding region 500 in FIG. 5B, which provided a probability map for pixels within region 500 that belong to the picture class. However, when arc 602 is analyzed by the table analyzer, it provides a high a priori estimate of probability that the arc corresponds to the "table" object type. The estimate is based on the output of the neural network for corresponding region 500 in FIG. 5C, which provided a probability map for pixels within region 500 that belong to the table class. The estimate is high as majority of the pixels are marked as having a high probability of being assigned to the table class, as indicated by the dark areas within region 500.

Subsequently, an a posteriori quality of arcs may be derived and one or more optimal complete paths may be selected. The a posteriori quality may be derived by running an analyzer corresponding to a particular class of object, such as, a text analyzer, a chart analyzer, a picture analyzer, a table analyzer, etc. Each of the analyzers analyses an arc using a corresponding mechanism to provide an a posteriori quality that an arc analyzed by the particular analyzer belongs to the object type represented by the analyzer. Each mechanism that is used to provide the a posteriori quality for an arc is more resource consuming then an quick analysis of the arc using a comparison with the output data of the convolutional neural network that is used to provide a priory quality for the arc (a more detailed description please see above). For example, for a posteriori quality estimation of a text arc (an arc that is analyzed by the text analyzer), a mechanism that collects paragraphs from lines is used. In some examples, when calculating the a posteriori estimate, factors such as the quality of the collected paragraphs, their alignment, whether they intersect the vertical separators, and if so, how much, etc. are taken into consideration. In another example, for a posteriori quality estimation of a picture arc, a mechanism that collects pictures from connected components is used, and may also evaluate them by a specialized classifier. When calculating the a posteriori estimate of a picture arc, factors such as the quality of the collected picture, fragments of words that fall into the arc region but are not included in the picture area are taken into consideration. In another example, for a posteriori quality estimation of a table arc, a mechanism that finds the structure of the table (e.g., the table's partitioning into cells) is used. Further a posteriori quality is calculated on the basis of this structure, for example, on how well the text lies in the cells, whether the cell structure is regular or not, whether there are empty cells, whether there are pictures in cells, etc.

In some implementations, the optimal path may be identified using an iterative process. In some example, the iterative process may include calculating a quality metric associated with each partial path of the LPG starting at the topmost vertex and ending at a current vertex being considered for the partial path. A partial path that ends at a current vertex that is the bottom most vertex is identified as a complete path. That is, in order to calculate the quality metric, for each iteration of the iterative process, a current vertex is selected from the plurality of vertices forming arcs of the LPG. A partial path between the top most vertex and the current vertex is identified. In some implementations, an a posteriori quality estimation may be performed at this stage for arcs that originate from the top most vertex and end at the current vertex. The quality metric for the partial path may be calculated based on 1) the a posteriori quality of the arcs between the top most vertex (e.g., starting vertex) and the current vertex, and 2) an auxiliary quantity corresponding to the current vertex. The a posteriori quality of the arcs may be derived by calculating a product of the a posteriori quality values of the plurality of arcs between the top most vertex and the current vertex. The auxiliary quantity corresponding to the current vertex may be derived based on quality of the auxiliary paths that connect the current vertex and the bottom most vertex (e.g., ending vertex). Quality of the auxiliary paths corresponds to the a priori quality of each arc included in the auxiliary paths. If multiple arcs exist within the path, their a priori quality values are multiplied to obtain the total a priori quality of the path. The auxiliary quality corresponds to the maximum a priori quality of the path that starts at the current vertex and ends at the bottom most vertex. In some implementations, the quality metric is derived by calculating a product of the value of the a posteriori quality of the arcs between the top most vertex and the current vertex and the auxiliary quantity corresponding to the current vertex based on a priori quality of the arcs between the current vertex and the bottom most vertex.

In an implementation, an algorithm to calculate a quality metric for a partial path and complete path to select one or more optimal complete paths may be as follows. An acyclic directional graph (or, a directed acyclic graph) may be expressed as: (V, A), where V={$v_0$, ..., $v_{n-1}$} is a set of vertices numbered 0 to n−1, according to an order of topological sorting, and A is a set of arcs. Each arc "a" in the set of arcs A may be associated with an a priori quality estimation, $\tilde{q}(a) \in [0,1]$, where the a priori quality estimate $\tilde{q}(a)$ is the estimate generated by each analyzer for each arc using the comparison with the output data of the convolutional neural network and where the a priority quality values may range between, and may include, the values 0 and 1.

Auxiliary quantities may be expressed as: {$r_t$, t=0, ... n−1}, where $r_t$ is the maximum a priori quality of the path that starts at the vertex $v_t$ and ends at a vertex $v_{n-1}$. These quantities can be calculated using dynamic programming during time O(|A|) by the following means:

It is assumed that $r_{n-1}=1$. That is, it is assumed that the maximum a priori quality of the path from the last vertex to the same last vertex is equal to one.

Calculations for values of $r_{t+1}$, ..., $r_n-1$ may be performed in advanced. For a given vertex $v_t$, a set of arcs $a_i$ may outcome. The set of arcs may be expressed as {$a_i=(v_t \rightarrow v_{t_i})$, i=0, ..., k−1}. Then the maximum value of the a priori quality estimate may be expressed as:

$$r_t = \max_{i=0,\ldots,k-1} \tilde{q}(a_i) r_{t_i}.$$

A path may be referred to as a partial path if it begins at vertex $v_0$ (e.g., the topmost vertex) and ends at some vertex $v_t$, $t \in \{1, n-1\}$, that is, the values of t ranging from 1 to n−1. A partial path will be called a complete path if it ends at vertex $v_{n-1}$.

The quality of a partial path p=<$v_0$, $a_0$, $v_1$, $a_1$, ..., $a_{t-1}$, $v_t$> may be calculated as identified in "formula (1)" as follows:

$$Q(p) = r_t \prod_{i=0}^{t-1} q(a_i),$$

where $q(a_i)$ is the a posteriori quality of the arc, that is, the quality of the result of the analysis of the arc obtained during the process of searching the paths for the one or more optimal paths. This calculation may be a more elaborate operation of superimposition of a block on the image rather than the operation being performed on each arc to get a priori estimate. For example, to obtain an a posteriori quality of a table, it is necessary to analyze the table by segmenting the table into cells and calculating the quality of its structure using various heuristic mechanisms. The a posteriori quality of an arc is not exceed its a priori quality estimate.

In some implementations, the search for a partial and/or complete paths may use an A* algorithm. The algorithm may include the following operational steps:

1. A priority queue H of paths may be set up where a path with a higher quality may have a higher priority position within the queue. Initially, the queue may be empty, that is, not paths are entered in the queue.

2. For each arc a in the LPG originating from the topmost vertex $v_0$, the arc a may be analyzed for the a posteriori quality, the quality metric of the corresponding partial path consisting of the arc a may be calculated and the path consisting of the arc a may be added to the appropriate priority position in the queue H.

3. A termination criterion may be set such that if the criterion is met, then the operations come to an end. If the termination criterion is not met, the subsequent steps are to be repeated. A termination criterion can be, for instance, when an amount of complete paths obtained from a queue meets a predetermined threshold.

4. The next partial path p existing within queue H may be obtained where the path ends at a vertex $v_t$.

5. If the partial path p is not a complete path, then for each arc a outcoming from the vertex $v_t$, the arc a may be analyzed for the a posteriori quality, and the quality metric of the corresponding partial path consisting of the path p and the arc a may be calculated and the path consisting of the path p and the arc a may be added to the queue H.

6. If the path p is a complete path, it may be returned as a result of the algorithm.

In some examples, more than one complete path within the LPG may be identified using the search. The above algorithm may return a plurality of complete paths in the order of non-increasing values of a quality metric. That is, the values of the quality metric for the paths may be equal or decreasing in values within the queue In some examples, some of the identified plurality of complete paths may represent segmentation options that are close to each other. The computer system may identify one complete path out of the plurality of complete paths in order to select the best segmentation option for the received image. Each of the complete paths may be associated with values of the quality metric. The quality metric may provide quality of one or more arcs in the aggregate. The one complete path may be characterized by a value of the quality metric. A threshold value of the quality metric may be selected. A complete path of the LPG that has a value of the quality metric above the threshold value may be selected as the complete path identified as providing the best segmentation option. In some examples, the threshold value may be derived based on a number of top values of the quality metric associated with one or more paths of the LPG where a range of the values for the top values are within a specified range. For example, there may be five complete paths identified within the LPG, and the values of the quality metric associated with the five complete paths may range from 0.5 to 0.9. In the example, the threshold value may be derived based on the top values of the five complete paths, where the top values range within a specified value range of 0.05. That is, the top values ranging from 0.9 to 0.85 may be considered for selecting the threshold value. Based on the available top values within the specified range, the threshold value maybe selected as 0.85. Any path that is above the threshold value of 0.85 may be included within the consideration for identifying the optimal, complete path of the LPG. For example, three out of the five complete paths may be above the threshold value of 0.85. One of these three complete paths may be selected as the final complete path. In some examples, the selection of the path may be based on a pairwise comparison of each of the plurality of complete paths. A comparator may be used to compare the results of a pair of complete paths to assess the block types within the pair of the complete paths. The comparator may take as input two segmentation results (e.g., two complete paths) with all of the arcs from both results being analyzed, investigate the differences in the paths and as an output provide an estimate of which of the two results is better in terms of accuracy of identification of block types. Each comparator may investigate very specific scenarios (e.g., whether tables analyzed by the comparator in fact consists of one table or two tables, etc.) and calculate its own score for the scenario. The scores may be used to select a one of the two complete paths analyzed by the comparator. Each complete path may go through this analysis and ultimately the complete path with the best score may be selected as the one complete path identified as the best path.

Figure 7:
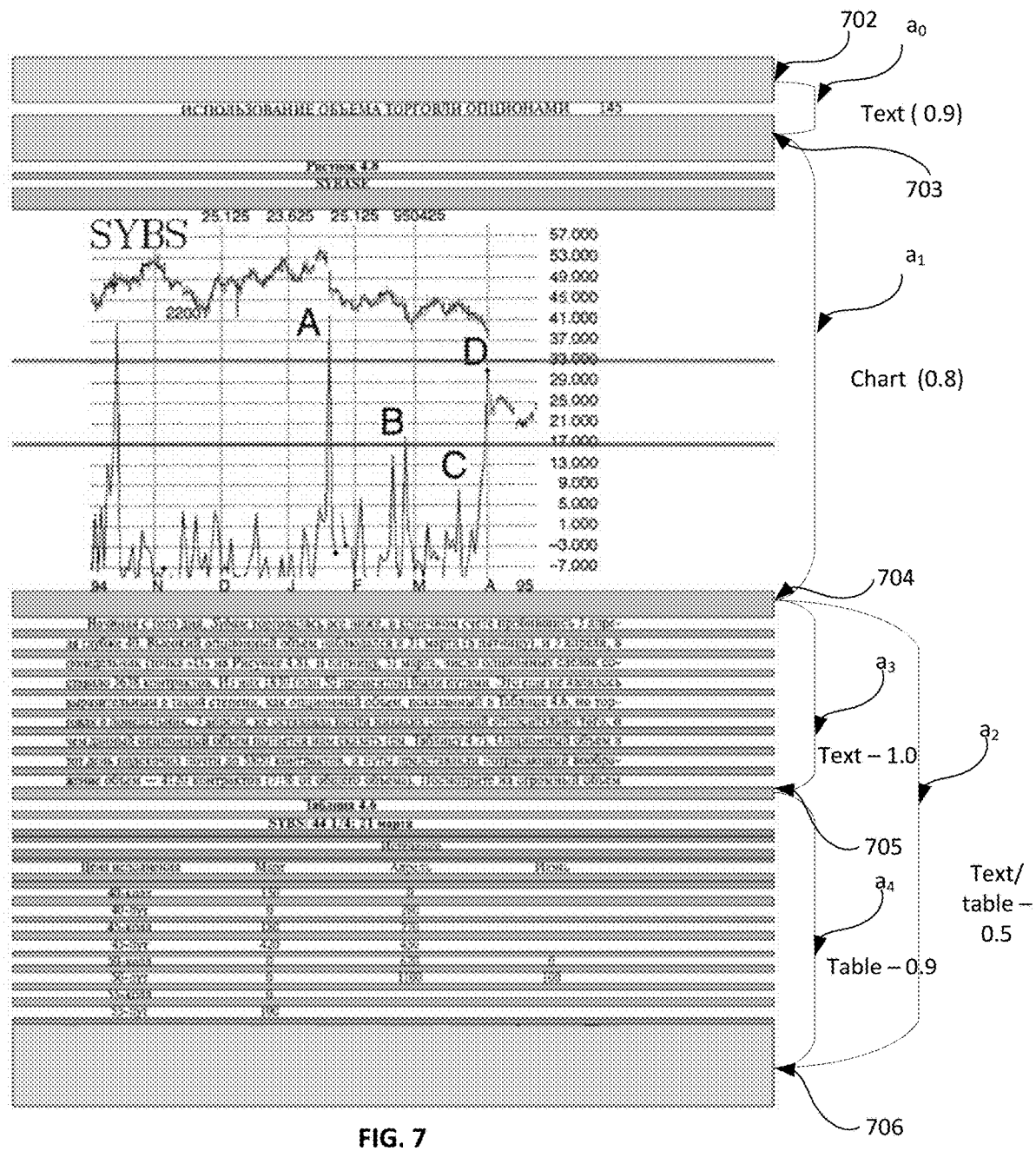
FIG. 7 depicts an illustrative example of calculation of a quality of a partial path of a linear partition graph, in accordance with one or more aspects of the present disclosure.

FIG. 7 shows an example of calculation of a quality of a path of a linear partition graph. In the example, the quality of a partial path starting at the top most vertex $v_0$, that is vertex 702, and ending at a current vertex $v_t$. The calculation may be performed using formula (1) as defined previously. According to the formula, the a posteriori qualities of the two arcs between the starting vertex $v_0$ and the current vertex $v_t$ (that is, vertex 702 and vertex 704) is calculated, and multiplied by the auxiliary quantity $r_t$ corresponding to the current vertex $v_t$ (vertex 704). In order to calculate the a posteriori qualities of the arcs between vertex 702 and vertex 704, a product of the a posteriori quality of the arc $a_0$ between vertex 702 and vertex 703 and the a posteriori quality of the arc $a_1$ between vertex 703 and vertex 704 is calculated. For the text arc $a_0$ starting at vertex 702 and ending at vertex 703, the a posteriori quality was provided to be 0.9. Similarly, for the chart arc $a_1$ starting at vertex 703 and ending at vertex 704, the a posteriori quality was provided to be 0.8, and the value resulted from the chart analyzer. Accordingly, the product of the quality values of the individual arcs $a_0$ and $a_1$ is the product of the values 0.9 and 0.8, which represents the a posteriori qualities of arcs between the starting vertex $v_0$ and the current vertex $v_t$ (that is, arcs between vertex 702 and vertex 704).

The auxiliary quantity $r_t$ is calculated by finding the maximum possible quality of the path from the current vertex $v_t$ (vertex 704) and ending vertex $v_{n-1}$ (vertex 706), which in turn correspond to the maximum a priori quality of the path starting at the current vertex $v_t$ (vertex 704) and ending vertex $v_{n-1}$ (vertex 706). There exist two possible paths starting at vertex 704 and ending at 706. The first option consists of two arcs: the first arc $a_3$ between vertex 704 and 705 with an a priori quality value of 1.0 resulting from a text analyzer, and the second arc $a_4$ between vertex 705 and 706 with an a priori quality value of 0.9 resulting from a table analyzer. The overall quality of the path between vertex 704 and 706 is then calculated as the product of these quality values 1.0 and 0.9, resulting in 0.9. The second option for the path starting at vertex 704 and ending at 706 is the single arc $a_2$ starting at vertex 704 and ending at 706 which has an a priori quality value of 0.5 resulting from each of a text analyzer and a table analyzer. Thus, the first option has a higher a priori quality value of 0.9 out of the two possible path options with a priori values of 0.9 and 0.5, and is chosen as having the maximum possible quality (the auxiliary quantity $r_t$) of the path from the current vertex $v_t$ (vertex 704) and ending vertex $v_{n-1}$ (vertex 706). As such, the quality of the partial path starting at vertex 702 and ending at vertex 704 is the product of the a posteriori qualities of the two arcs between the starting vertex $v_0$ and the current vertex $v_t$ (that is, 0.9×0.8) and the auxiliary quantity $r_t$ corresponding to the current vertex $v_t$ (that is, 0.9), which is:

$$0.9 \times 0.8 \times 0.9 = 0.648.$$

Figure 8A:
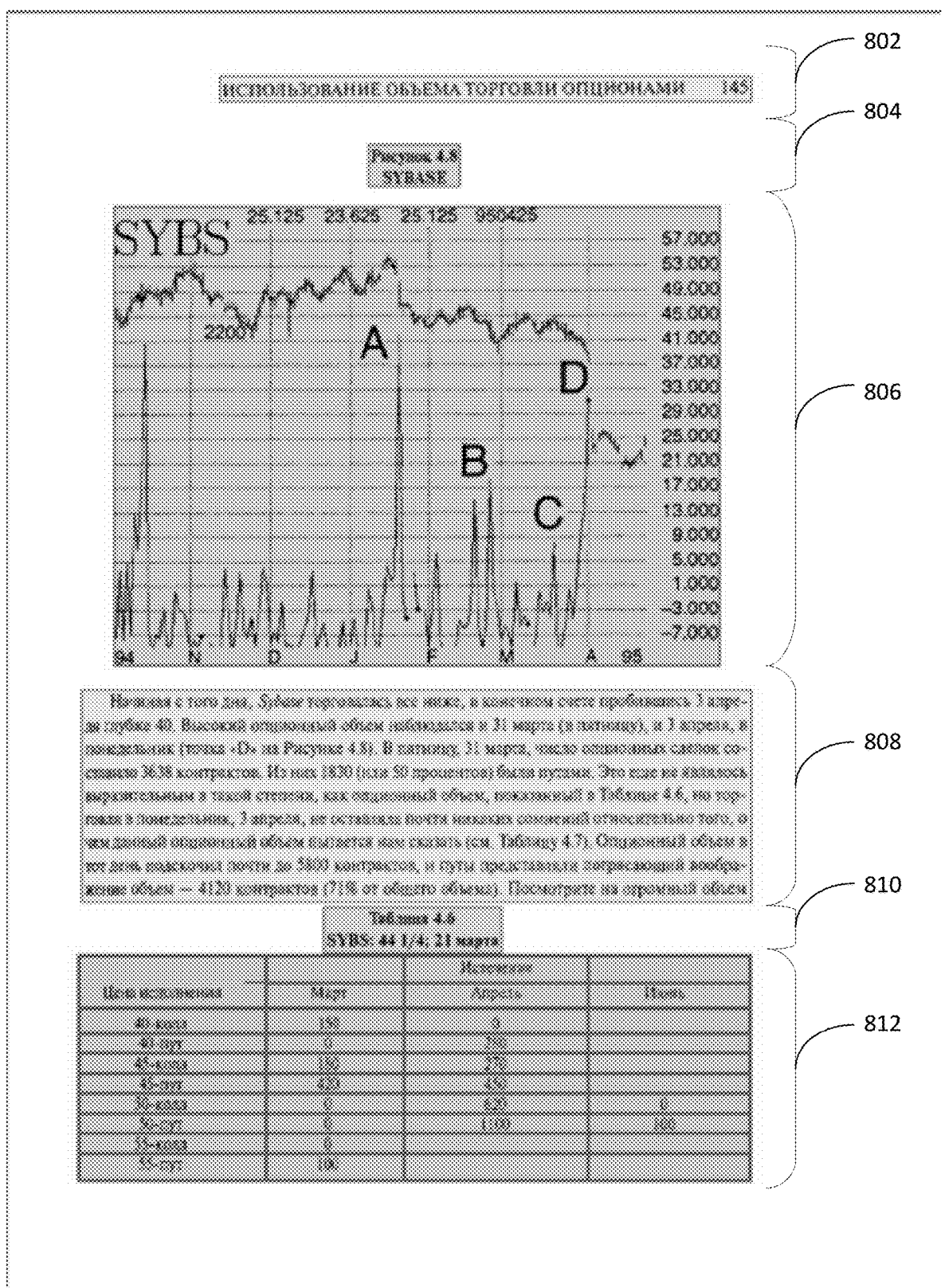
FIGS. 8A-8C depict examples of results of analysis of various paths of a linear partition graph, in accordance with one or more aspects of the present disclosure.
Figure 8B:
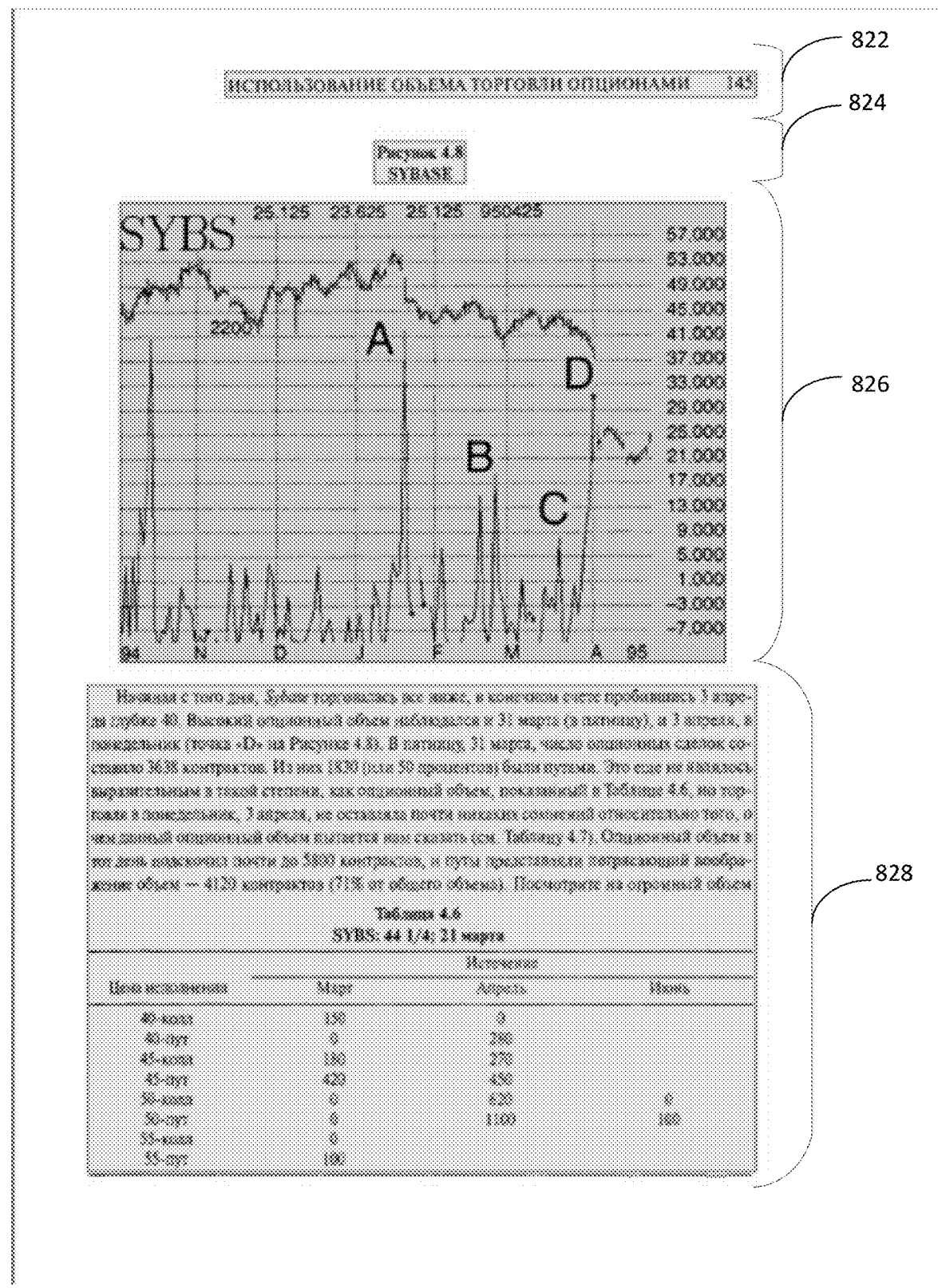
Figure 8C:
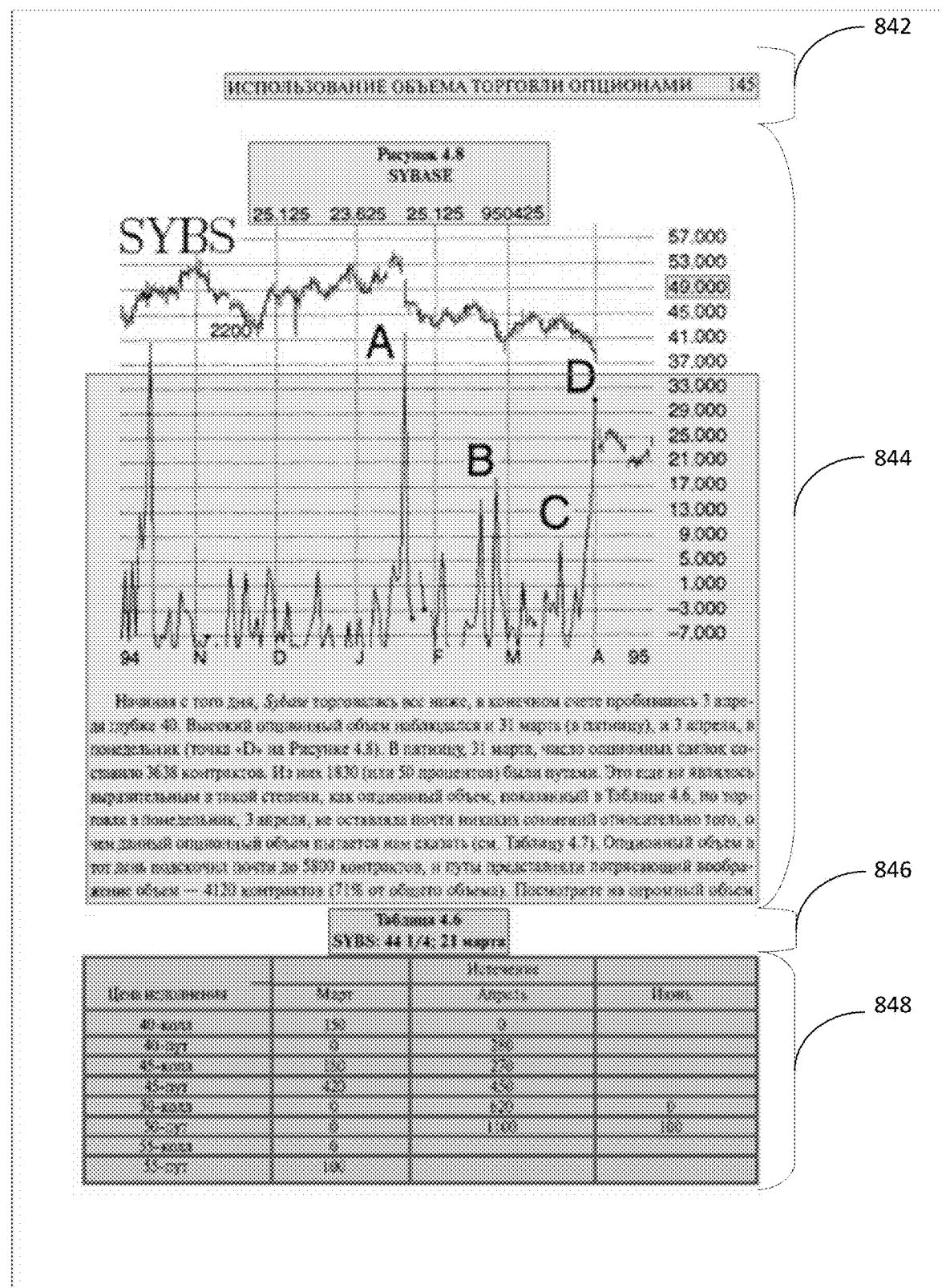

If multiple complete paths are identified with close enough quality values, then comparators are used to perform pairwise comparison between the complete paths and the best complete path is chosen as determined by the comparators. For example, FIGS. 8A-8C depict examples of results of analysis of various paths the LPG. As a result of the analysis, a complete path was identified in FIG. 8A as including a set of arcs 802 to 812. Similarly, in FIG. 8B, a complete path includes set of arcs 822 to 828 and in FIG. 8C, a complete path includes set of arcs 842 to 848. In one example, the complete path identified in FIG. 8A has the highest value of the quality metric calculated for the complete path, and selected as the true path identifying the segmentation of the image over the complete paths of FIGS. 8B and 8C. In another example, each of the complete paths in FIGS. 8A-8C may have quality metric values that are close to each other (e.g., within a specified range of values). The complete paths are then compared against each other using pairwise comparators to select the final true path (e.g., best path representing accurate segmentation option) and the complete path of FIG. 8A is selected.

Referring back to FIG. 2, at block 250, the computer system may generate one or more blocks of the image. Each of the one or more blocks may correspond to an arc of the one or more arcs of the identified path and represent a portion of the image associated with a type of an object. For example, as shown in FIG. 8A, multiple blocks within the received image is generated as a result of the analysis of each arc within the identified complete path. The identified complete path of FIG. 8A comprises the multiple blocks that are generated. Each of the blocks correspond to an arc of the set of arcs 802 to 812 included within the identified path. Each of the blocks represents a portion of the received image that is associated with a particular type of object. For example, the blocks corresponding to arcs 802 and 808 represent text blocks, the blocks corresponding to arcs 804 and 810 represent title blocks, the block corresponding to arc 806 represents a chart block, and the block corresponding to arc 812 represents a table block. In some implementations, these results of the segmentation may be provided to a recognition module, which may be internal or external to the computer system performing the segmentation.

Figure 9:
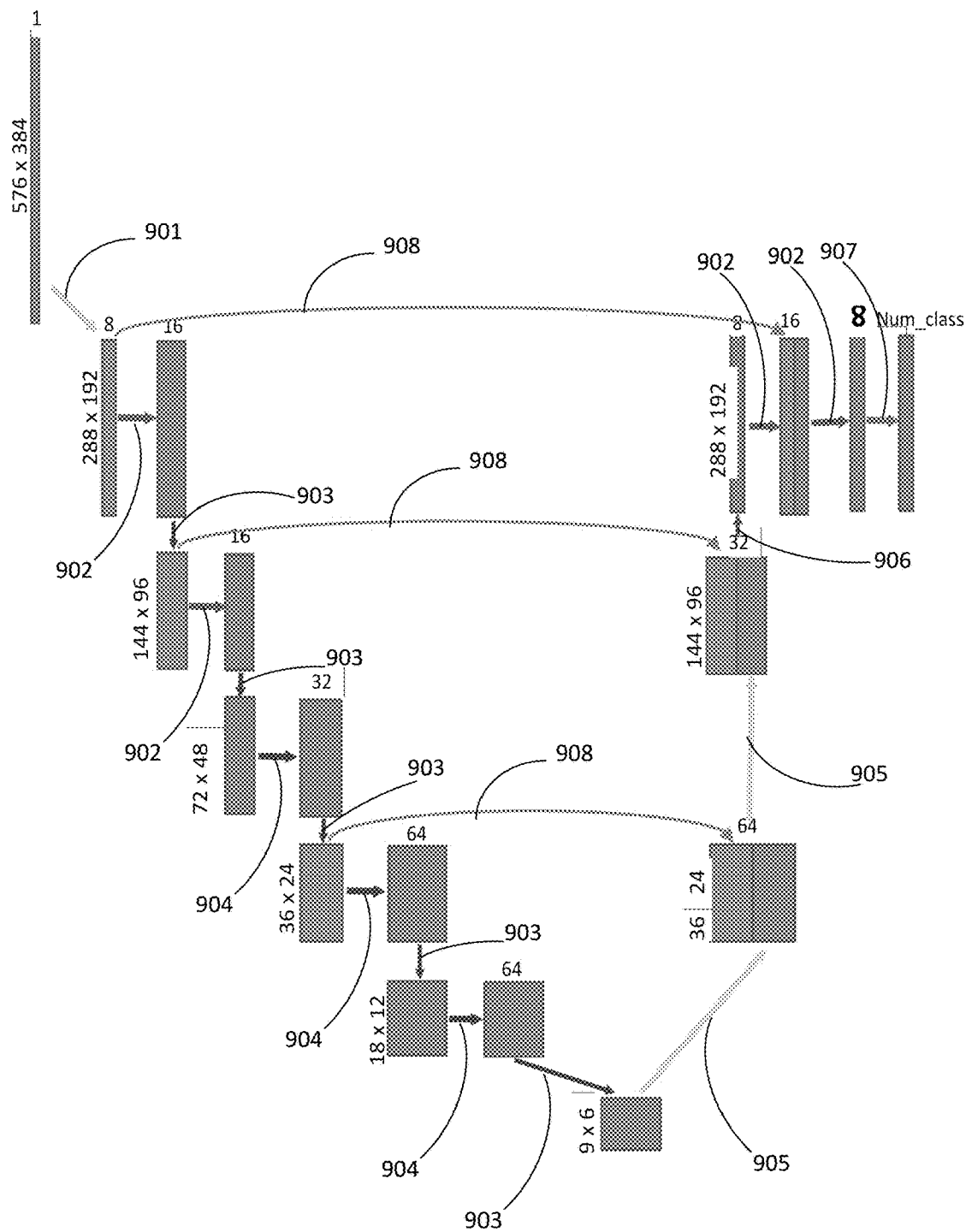
FIG. 9 depicts an illustrative example of a neural network topology in accordance with one or more aspects of the present disclosure.

FIG. 9 depicts an illustrative example of a neural network topology in accordance with one or more aspects of the present disclosure. The neural network may correspond to the model 140 and training engine 151 described in FIG. 1, and/or used to generate the probability maps depicted in FIGS. 5A-5C. As discussed above, a priori estimates are assigned to each arc based on the analysis of a document page by a neural network, such as, a convolutional neural network. For example, a gray image of a fixed size may be input into the neural network, using an input matrix of X, Y, and Z, where X and Y represent the width and height of the image, respectively, and Z represents the number of channels. For a gray image, the number of channels for the input is 1. The output may predict the probabilities that each pixel corresponded to an image belonging to each of the N classes, which may be predefined. For example, in one embodiment, N may equal to the number 3, and the classes correspond to a text, a picture, and a table class. Each pixel can, with various probabilities, be ascribed to multiple classes. The output may be a matrix of size 288×192×N, where N is the number of channels, representing the number of classes. An example of the network topology utilized by the convolutional network can be described in terms of the operations performed by the network to the images using particular filter sizes, padding sizes, and steps. The example shown is FIG. 9 has the following operations: arrow 901 performs a convolution and ReLu (Rectifier Linear Unit) operation using a 3×3 filter size, 1×1 padding size, and 2 steps; each arrow 902 performs a convolution and ReLu operation using a 3×3 filter size, 1×1 padding size, and 1 step; each arrow 904 performs a crossing convolution operation using 1×9, 9×1, and 3×3 filter sizes, 0×4, 4×0, and 1×1 padding sizes, and 1 step; each arrow 903 performs a max pooling operation using a 2×2 filter size, 0×0 padding size, and 2 steps; each arrow 905 performs a transposed convolution and ReLu operation using a 4×4 filter size, 0×0 padding size, and 4 steps; arrow 906 performs a transposed convolution and ReLu operation using a 6×6 filter size, 2×2 padding size, and 1 step; arrow 907 performs a convolution and Sigmoid operation using a 3×3 filter size, 1×1 padding size, and 1 step; and each arrow 908 performs a channel concatenation operation. As the topology relates to FIGS. 5A-5C, the FIGS. 5A-5C shows slices of the output matrix 288×192×N, where N=3: channel 1 (text), channel 2 (picture), and channel 3 (table). Each channel is a gray image described by the numbers ranging from 0 to 1, which can be interpreted as follows: 0 is the color white, and 1 is the color black (e.g., the more confidently or with higher probability a pixel is interpreted, the darker the color may be).

Figure 10:
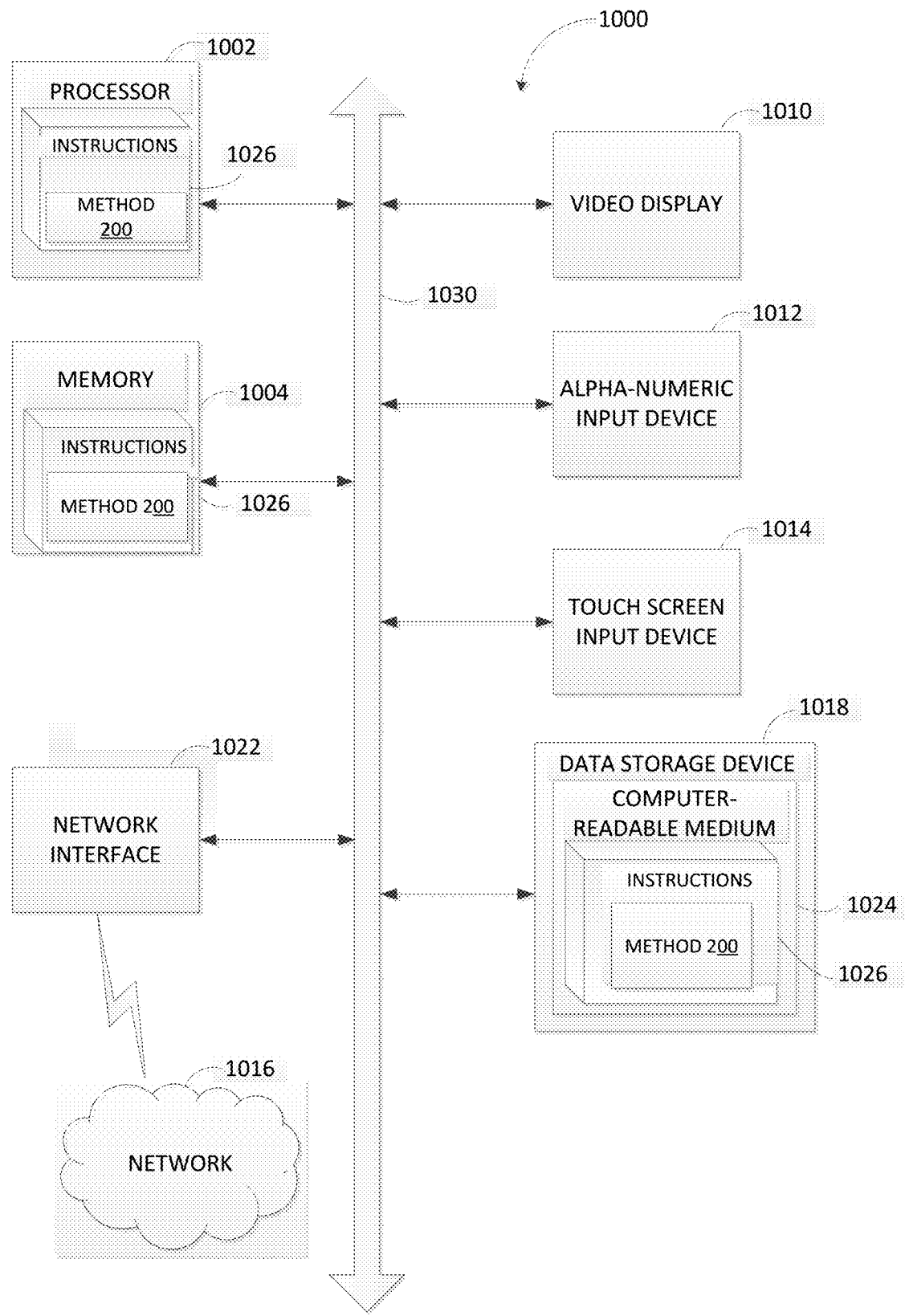
FIG. 10 depicts an example computer system which can perform any one or more of the methods described herein, in accordance with one or more aspects of the present disclosure.

FIG. 10 depicts an example computer system 1000 which can perform any one or more of the methods described herein, in accordance with one or more aspects of the present disclosure. In one example, computer system 1000 may correspond to a computing device capable of performing method 200 of FIG. 2. The computer system 1000 may be connected (e.g., networked) to other computer systems in a LAN, an intranet, an extranet, or the Internet. The computer system 1000 may operate in the capacity of a server in a client-server network environment. The computer system 1000 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1000 includes a processing device 1002, a memory 1004 (e.g., read-only memory (ROM), flash memory, dynamic random access memory (DRAM) such as synchronous DRAM (SDRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a network). In one illustrative example, the video display unit 1010, the alphanumeric input device 1012, and the cursor control device 1014 may be combined into a single component or device (e.g., an LCD touch screen).

The data storage device 1018 may include a computer-readable medium 1024 on which the instructions 1026 embodying any one or more of the methodologies or functions described herein is stored. The instructions 1026 may also reside, completely or at least partially, within the memory 1004 and/or within the processing device 1002 during execution thereof by the computer system 1000, the memory 1004 and the processing device 1002 also constituting computer-readable media. The instructions 1026 may further be transmitted or received over a network via the network interface device 1022.

While the computer-readable storage medium 1024 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the be specially constructed for the required purposes, or it may comprise a general purpose ose computer selectively activated or reconfigured by a computer program stored in the ter. Such a computer prog Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device, an image depicting at least a part of a document;
   identifying a plurality of partition points dividing the image into potential segments;
   generating a linear partition graph (LPG) comprising a plurality of vertices using the plurality of partition points and a plurality of arcs connecting the plurality of vertices;
   identifying a path of the LPG having a value of a quality metric above a threshold value, wherein the path is selected from a plurality of paths of the LPG and comprises one or more arcs of the plurality of arcs and the value of the quality metric is derived using a neural network classifying each of a plurality of pixels of the image; and
   generating one or more blocks of the image wherein each of the one or more blocks corresponds to an arc of the one or more arcs of the identified path and represents a portion of the image associated with a type of an object.

2. The method of claim 1, wherein the threshold value is derived based on a number of top values of the quality metric associated with one or more paths of the LPG, wherein a range of the values for the top values are within a specified range.

3. The method of claim 1, wherein the identified path is selected from the plurality of paths having values of the quality metric above the threshold value, the selection based on a pairwise comparison of each of the plurality of paths.

4. The method of claim 1, wherein the LPG is a directed acyclic graph (DAG).

5. The method of claim 1, wherein generating the LPG comprises selecting a subset of the plurality of partition points as the plurality of vertices of the LPG based on one or more of:
 average width of a space corresponding to each of the plurality of partition points;
 maximum quality of separators piercing the space; or
 weighted quantity of separators that pierce the space.

6. The method of claim 1, wherein generating the LPG comprises:
 selecting pairs of vertices from the plurality of vertices of the LPG, and
 connecting each of the selected pairs of vertices to form each of the plurality of arcs of the LPG.

7. The method of claim 6, wherein the selection of the pairs of vertices is based on one or more of:
 relative dimension of portions of the image corresponding to partition points;
 maximum quality indicator of partition points encompassed within the pairs of the vertices;
 weighted quantity of partition points encompassed within the pairs of the vertices;
 a quality of the pairs of vertices being connected; or
 a number of partition points below a currently considered partition point.

8. The method of claim 1, wherein values of the quality metric for the plurality of paths of the LPG are derived based on an a priori estimate of probabilities of each arc of the plurality of arcs corresponding to each of a number of predetermined object types.

9. The method of claim 8, wherein the a priori estimate of probabilities are estimated based on a subset of the plurality of pixels of the image corresponding to each arc of the plurality of arcs based on the neural network classifying each of the plurality of pixels of the image.

10. The method of claim 9, wherein the image is provided to the neural network as an input and a set of probabilities are obtained as output from the neural network for each of the plurality of pixels of the image belonging to each of a plurality of predetermined classes of objects corresponding to each of the number of predetermined object types.

11. The method of claim 8, wherein values of the quality metric for the one or more arcs of the plurality of arcs are derived based on an iterative process, wherein for each iteration of the iterative process, a current vertex is selected from the plurality of vertices and an a posteriori quality value is derived for arcs between a starting vertex of the LPG and the current vertex.

12. The method of claim 11, wherein values of the quality metric are further derived based on an auxiliary quantity corresponding to the current vertex indicating a maximum value of the a priori estimate of probabilities for arcs between the current vertex and an ending vertex of the LPG.

13. The method of claim 12, wherein the values of the quality metric is calculated by multiplying the a posteriori quality value and the auxiliary quantity corresponding to the current vertex.

14. The method of claim 1, wherein the part of the document comprises a single column structure wherein objects within the part of the document have an orientation in a same direction.

15. A system comprising:
 a memory device storing instructions;
 a processing device coupled to the memory device, the processing device to execute the instructions to:
  receive an image depicting at least a part of a document;
  identify a plurality of partition points dividing the image into potential segments;
  generate a linear partition graph (LPG) comprising a plurality of vertices using the plurality of partition points and a plurality of arcs connecting the plurality of vertices;
  identify a path of the LPG having a value of a quality metric above a threshold value, wherein the path is selected from a plurality of paths of the LPG and comprises one or more arcs of the plurality of arcs and the value of the quality metric is derived using a neural network classifying each of a plurality of pixels of the image; and
  generate one or more blocks of the image wherein each of the one or more blocks corresponds to an arc of the one or more arcs of the identified path and represents a portion of the image associated with a type of an object.

16. The system of claim 15, wherein values of the quality metric for the plurality of paths of the LPG are derived based on an a priori estimate of probabilities of each arc of the plurality of arcs corresponding to each of a number of predetermined object types.

17. The system of claim 16, wherein the a priori estimate of probabilities are estimated based on a subset of the plurality of pixels of the image corresponding to each arc of the plurality of arcs based on the neural network classifying each of the plurality of pixels of the image.

18. The system of claim 17, wherein the image is provided to the neural network as an input and a set of probabilities are obtained as output from the neural network for each of the plurality of pixels of the image belonging to each of a plurality of predetermined classes of objects corresponding to each of the number of predetermined object types.

19. A non-transitory computer-readable storage medium comprising instructions that, when executed by a processing device, cause the processing device to:
 receive an image depicting at least a part of a document;
 identify a plurality of partition points dividing the image into potential segments;
 generate a linear partition graph (LPG) comprising a plurality of vertices using the plurality of partition points and a plurality of arcs connecting the plurality of vertices;
 identify a path of the LPG having a value of a quality metric above a threshold value, wherein the path is selected from a plurality of paths of the LPG and comprises one or more arcs of the plurality of arcs and the value of the quality metric is derived using a neural network classifying each of a plurality of pixels of the image; and
 generate one or more blocks of the image wherein each of the one or more blocks corresponds to an arc of the one or more arcs of the identified path and represents a portion of the image associated with a type of an object.

20. The non-transitory computer-readable storage medium of claim 19, wherein values of the quality metric for the plurality of paths of the LPG are derived based on an a priori estimate of probabilities of each arc of the plurality of arcs corresponding to each of a number of predetermined object types.

* * * * *